(12) United States Patent
Deng

(10) Patent No.: US 8,297,968 B2
(45) Date of Patent: Oct. 30, 2012

(54) PILOT ASSEMBLIES FOR HEATING DEVICES

(75) Inventor: David Deng, Diamond Bar, CA (US)

(73) Assignee: Continental Appliances, Inc., Brea, CA (US)

( * ) Notice: Subject to any disclaimer, the term of this patent is extended or adjusted under 35 U.S.C. 154(b) by 46 days.

(21) Appl. No.: 12/581,758

(22) Filed: Oct. 19, 2009

(65) Prior Publication Data
US 2010/0035196 A1   Feb. 11, 2010

Related U.S. Application Data

(63) Continuation of application No. 11/649,976, filed on Jan. 5, 2007.

(60) Provisional application No. 60/871,761, filed on Dec. 22, 2006.

(51) Int. Cl.
*F23Q 9/00* (2006.01)

(52) U.S. Cl. ............ 431/278; 431/156; 431/75; 431/77; 431/42

(58) Field of Classification Search .................... 431/12, 431/18, 42, 43, 48, 75–77, 80, 278–280; 126/39 E; 137/625.4, 142, 625, 597, 625.47, 137/625.32, 905
See application file for complete search history.

(56) References Cited

U.S. PATENT DOCUMENTS

| | | |
|---|---|---|
| 743,714 A | 11/1903 | Guese |
| 1,051,072 A | 1/1913 | Bradley |
| 1,216,529 A | 2/1917 | Wilcox |
| 1,589,386 A | 6/1926 | Harper |
| 1,639,780 A | 8/1927 | Mulholland |
| 1,867,110 A | 7/1932 | Signore |
| 1,961,086 A | 5/1934 | Sherman et al. |
| 2,160,264 A | 5/1939 | Furlong |
| 2,319,676 A | 5/1943 | Guelson |
| 2,380,956 A | 8/1945 | Evarts |
| 2,422,368 A | 6/1947 | Ray |
| 2,443,892 A | 6/1948 | Caparone |
| 2,556,337 A | 6/1951 | Paille |
| 2,630,821 A | 3/1953 | Arey et al. |
| 2,661,157 A | 12/1953 | Reichelderfer |
| 2,687,140 A | 8/1954 | St. Clair et al. |

(Continued)

FOREIGN PATENT DOCUMENTS

CA 2391757 1/2003

(Continued)

OTHER PUBLICATIONS

International Search Report and Written Opinion for International Application No. PCT/US2010/039668, Notification mailed Oct. 1, 2010.

(Continued)

*Primary Examiner* — Kenneth Rinehart
*Assistant Examiner* — Daniel Bernstein
(74) *Attorney, Agent, or Firm* — Knobbe Martens Olson & Bear LLP

(57) ABSTRACT

In certain embodiments, an apparatus can comprise a dual fuel pilot assembly. The pilot assembly can comprise a first fuel dispenser, a second fuel dispenser, an igniter and at least one of a thermocouple, and a thermopile. The pilot assembly can be configured to direct heat from combustion of one of either a first fuel or a second fuel to the at least one of the thermocouple and the thermopile.

18 Claims, 22 Drawing Sheets

U.S. PATENT DOCUMENTS

| | | | |
|---|---|---|---|
| 2,905,361 A | 9/1959 | Noall | |
| 3,001,541 A | 9/1961 | St. Clair et al. | |
| 3,032,096 A | 5/1962 | Stoul | |
| 3,139,879 A | 7/1964 | Bauer et al. | |
| 3,331,392 A | 7/1967 | Davidson et al. | |
| 3,417,779 A | 12/1968 | Golay | |
| 3,430,655 A | 3/1969 | Forney | |
| 3,590,806 A | 7/1971 | Locke | |
| 3,800,830 A | 4/1974 | Etter | |
| 3,814,573 A | 6/1974 | Karlovetz | |
| 3,829,279 A | 8/1974 | Qualley et al. | |
| 3,884,413 A | 5/1975 | Berquist | |
| 3,939,871 A | 2/1976 | Dickson | |
| D243,694 S | 3/1977 | Faulkner | |
| 4,021,190 A | 5/1977 | Dickson | |
| 4,081,235 A | 3/1978 | Van der Veer | |
| 4,101,257 A | 7/1978 | Straitz, III | |
| 4,157,238 A | 6/1979 | Van Berkum | |
| 4,290,450 A | 9/1981 | Swanson | |
| 4,301,825 A | 11/1981 | Simko | |
| 4,340,362 A | 7/1982 | Chalupsky et al. | |
| 4,348,172 A | 9/1982 | Miller | |
| 4,355,659 A | 10/1982 | Kelchner | |
| 4,359,284 A | 11/1982 | Kude et al. | |
| 4,474,166 A | 10/1984 | Shaftner et al. | |
| 4,640,680 A | 2/1987 | Schilling | |
| 4,718,846 A | 1/1988 | Oguri et al. | |
| 4,768,543 A | 9/1988 | Wienke et al. | |
| 4,768,947 A | 9/1988 | Adachi | |
| 4,782,814 A | 11/1988 | Cherryholmes | |
| 4,796,652 A | 1/1989 | Hafla | |
| 4,848,133 A | 7/1989 | Paulis et al. | |
| 4,848,313 A | 7/1989 | Velie | |
| 4,874,006 A | 10/1989 | Iqbal | |
| 4,930,538 A | 6/1990 | Browne | |
| 4,962,749 A | 10/1990 | Dempsey et al. | |
| 4,965,707 A | 10/1990 | Butterfield | |
| 5,025,990 A | 6/1991 | Ridenour | |
| 5,027,854 A | 7/1991 | Genbauffe | |
| 5,090,899 A | 2/1992 | Kee | |
| 5,172,728 A | 12/1992 | Tsukazaki | |
| 5,239,979 A | 8/1993 | Maurice et al. | |
| 5,251,823 A | 10/1993 | Joshi et al. | |
| 5,278,936 A | 1/1994 | Shao | |
| 5,379,794 A | 1/1995 | Brown | |
| 5,397,233 A | 3/1995 | Eavenson et al. | |
| 5,413,141 A | 5/1995 | Dietiker | |
| 5,470,018 A | 11/1995 | Smith | |
| 5,513,798 A | 5/1996 | Tavor | |
| 5,542,609 A | 8/1996 | Myers et al. | |
| 5,567,141 A | 10/1996 | Joshi et al. | |
| 5,584,680 A | 12/1996 | Kim | |
| 5,591,024 A | 1/1997 | Eavenson et al. | |
| 5,603,211 A | 2/1997 | Graves | |
| 5,642,580 A | 7/1997 | Hess et al. | |
| 5,645,043 A | 7/1997 | Long et al. | |
| 5,674,065 A * | 10/1997 | Grando et al. | 431/54 |
| D391,345 S | 2/1998 | Mandir et al. | |
| 5,782,626 A | 7/1998 | Joos et al. | |
| 5,787,874 A | 8/1998 | Krohn et al. | |
| 5,787,928 A | 8/1998 | Allen et al. | |
| 5,807,098 A | 9/1998 | Deng | |
| 5,814,121 A | 9/1998 | Travis | |
| 5,838,243 A | 11/1998 | Gallo | |
| 5,915,952 A | 6/1999 | Manning et al. | |
| 5,941,699 A | 8/1999 | Abele | |
| 5,966,937 A | 10/1999 | Graves | |
| 5,971,746 A | 10/1999 | Givens et al. | |
| 5,975,112 A | 11/1999 | Ohmi et al. | |
| 5,987,889 A | 11/1999 | Graves et al. | |
| 5,988,204 A | 11/1999 | Reinhardt et al. | |
| 6,027,335 A * | 2/2000 | Griffioen | 431/266 |
| 6,035,893 A | 3/2000 | Ohmi et al. | |
| 6,045,058 A | 4/2000 | Dobbeling et al. | |
| 6,076,517 A | 6/2000 | Kahlke et al. | |
| 6,135,063 A | 10/2000 | Welden | |
| 6,162,048 A * | 12/2000 | Griffioen et al. | 431/156 |
| 6,227,451 B1 | 5/2001 | Caruso | |
| 6,244,223 B1 | 6/2001 | Welk | |
| 6,244,524 B1 | 6/2001 | Tackels et al. | |
| 6,257,270 B1 | 7/2001 | Ohmi et al. | |
| 6,293,784 B1 * | 9/2001 | Griffioen | 431/343 |
| 6,340,298 B1 | 1/2002 | Vandrak et al. | |
| 6,354,072 B1 | 3/2002 | Hura | |
| 6,354,078 B1 | 3/2002 | Karlsson et al. | |
| 6,543,235 B1 | 4/2003 | Crocker et al. | |
| 6,607,854 B1 | 8/2003 | Rehg et al. | |
| 6,648,635 B2 | 11/2003 | Vandrak et al. | |
| 6,786,194 B2 | 9/2004 | Koegler et al. | |
| 6,845,966 B1 | 1/2005 | Albizuri | |
| 6,884,065 B2 | 4/2005 | Vandrak et al. | |
| 6,901,962 B2 | 6/2005 | Kroupa et al. | |
| 6,904,873 B1 | 6/2005 | Ashton | |
| 6,910,496 B2 | 6/2005 | Strom | |
| 6,938,634 B2 | 9/2005 | Dewey | |
| 7,013,886 B2 | 3/2006 | Deng | |
| 7,044,729 B2 | 5/2006 | Ayastuy | |
| 7,048,538 B2 | 5/2006 | Albizuri | |
| 7,156,370 B2 | 1/2007 | Albizuri | |
| 7,174,913 B2 | 2/2007 | Albizuri | |
| 7,201,186 B2 | 4/2007 | Ayastuy | |
| 7,251,940 B2 | 8/2007 | Graves et al. | |
| 7,255,100 B2 | 8/2007 | Repper et al. | |
| 7,299,799 B2 | 11/2007 | Albizuri | |
| 7,367,352 B2 | 5/2008 | Hagen et al. | |
| 7,434,447 B2 | 10/2008 | Deng | |
| 7,458,386 B2 | 12/2008 | Zhang | |
| 7,487,888 B1 | 2/2009 | Pierre, Jr. | |
| 7,490,869 B2 | 2/2009 | Iturralde et al. | |
| 7,528,608 B2 | 5/2009 | Elexpuru et al. | |
| 7,533,656 B2 | 5/2009 | Dingle | |
| 7,591,257 B2 | 9/2009 | Bayer et al. | |
| 7,600,529 B2 | 10/2009 | Querejeta | |
| 7,607,325 B2 | 10/2009 | Elexpuru et al. | |
| 7,607,426 B2 | 10/2009 | Deng | |
| 7,634,993 B2 | 12/2009 | Bellomo | |
| 7,637,476 B2 | 12/2009 | Mugica et al. | |
| 7,641,470 B2 | 1/2010 | Albizuri | |
| 7,651,330 B2 | 1/2010 | Albizuri | |
| 7,654,820 B2 | 2/2010 | Deng | |
| 7,677,236 B2 | 3/2010 | Deng | |
| 7,730,765 B2 | 6/2010 | Deng | |
| 7,758,323 B2 | 7/2010 | Orue | |
| 7,766,006 B1 * | 8/2010 | Manning | 126/99 R |
| 7,861,706 B2 | 1/2011 | Bellomo | |
| 7,967,006 B2 | 6/2011 | Deng | |
| 7,967,007 B2 | 6/2011 | Deng | |
| 8,011,920 B2 | 9/2011 | Deng | |
| 8,152,515 B2 | 4/2012 | Deng | |
| 2002/0058266 A1 | 5/2002 | Clough et al. | |
| 2002/0160325 A1 | 10/2002 | Deng | |
| 2002/0160326 A1 | 10/2002 | Deng | |
| 2003/0217555 A1 | 11/2003 | Gerhold | |
| 2004/0226600 A1 * | 11/2004 | Starer et al. | 136/224 |
| 2004/0238030 A1 | 12/2004 | Dewey, Jr. | |
| 2005/0167530 A1 | 8/2005 | Ward et al. | |
| 2005/0202361 A1 | 9/2005 | Albizuri | |
| 2005/0208443 A1 | 9/2005 | Bachinski et al. | |
| 2006/0096644 A1 | 5/2006 | Goldfarb et al. | |
| 2006/0201496 A1 | 9/2006 | Shingler | |
| 2007/0044856 A1 | 3/2007 | Bonior | |
| 2007/0154856 A1 * | 7/2007 | Hallit et al. | 431/62 |
| 2007/0210069 A1 | 9/2007 | Albizuri | |
| 2007/0277803 A1 | 12/2007 | Deng | |
| 2008/0121116 A1 | 5/2008 | Albizuri | |
| 2008/0149871 A1 | 6/2008 | Deng | |
| 2008/0149872 A1 | 6/2008 | Deng | |
| 2008/0153044 A1 | 6/2008 | Deng | |
| 2008/0153045 A1 | 6/2008 | Deng | |
| 2008/0168980 A1 | 7/2008 | Lyons et al. | |
| 2008/0223465 A1 | 9/2008 | Deng | |
| 2008/0227045 A1 | 9/2008 | Deng | |
| 2008/0236688 A1 | 10/2008 | Albizuri | |
| 2008/0236689 A1 | 10/2008 | Albizuri | |
| 2008/0314090 A1 | 12/2008 | Orue Orue et al. | |
| 2009/0039072 A1 | 2/2009 | Llona | |
| 2009/0139304 A1 | 6/2009 | Deng | |

| | | | |
|---|---|---|---|
| 2009/0140193 A1 | 6/2009 | Albizuri Landa | |
| 2009/0159068 A1 | 6/2009 | Querejeta et al. | |
| 2009/0280448 A1 | 11/2009 | Antxia Uribetxbarria et al. | |
| 2010/0035195 A1 | 2/2010 | Querejeta Andueza et al. | |
| 2010/0035196 A1 | 2/2010 | Deng | |
| 2010/0037884 A1 | 2/2010 | Deng | |
| 2010/0086884 A1 | 4/2010 | Querejeta Andueza et al. | |
| 2010/0086885 A1 | 4/2010 | Querejeta Andueza et al. | |
| 2010/0089385 A1 | 4/2010 | Albizuri | |
| 2010/0089386 A1 | 4/2010 | Albizuri | |
| 2010/0095945 A1 | 4/2010 | Manning | |
| 2010/0154777 A1 | 6/2010 | Carvalho et al. | |
| 2010/0170503 A1 | 7/2010 | Deng | |
| 2010/0255433 A1 | 10/2010 | Querejeta Andueza et al. | |
| 2010/0275953 A1 | 11/2010 | Orue Orue et al. | |
| 2010/0304317 A1 | 12/2010 | Deng | |
| 2010/0310997 A1 | 12/2010 | Mugica Odriozola et al. | |
| 2010/0326422 A1 | 12/2010 | Deng | |
| 2010/0326430 A1 | 12/2010 | Deng | |
| 2010/0330518 A1 | 12/2010 | Deng | |
| 2010/0330519 A1 | 12/2010 | Deng | |
| 2011/0081620 A1 | 4/2011 | Deng | |
| 2012/0080024 A1 | 4/2012 | Deng | |
| 2012/0132189 A1 | 5/2012 | Deng | |

FOREIGN PATENT DOCUMENTS

| | | |
|---|---|---|
| CN | 1873268 | 12/2006 |
| DE | 720 854 C | 5/1942 |
| JP | 58 219320 A | 12/1983 |
| JP | 59009425 | 1/1984 |
| JP | 62169926 | 7/1987 |
| JP | 03 230015 A | 10/1991 |
| JP | 10141656 | 5/1998 |
| JP | 11192166 | 7/1999 |
| JP | 11193929 | 7/1999 |
| JP | 11-344216 | 12/1999 |
| JP | 2000234738 | 8/2000 |
| JP | 2003 056845 A | 2/2003 |
| JP | 2003-65533 | 3/2003 |
| JP | 2003 074837 A | 3/2003 |
| JP | 2003 074838 A | 3/2003 |
| JP | 2003-83537 | 3/2003 |
| JP | 2003-90517 | 3/2003 |
| JP | 2010071477 | 4/2010 |
| WO | WO 2008/071970 | 6/2008 |

OTHER PUBLICATIONS

International Search Report and Written Opinion for International Application No. PCT/US2010/039687, Notification mailed Oct. 5, 2010.

International Search Report and Written Opinion for International Application No. PCT/US2010/039655, Notification mailed Jan. 14, 2011.

International Search Report and Written Opinion for International Application No. PCT/US2010/039681, Notification mailed Jan. 12, 2011.

Heat and Glo, Escape-42DV Owner's Manual, Rev. i, Dec. 2006.

Heat and Glo. Escape Series Gas Fireplaces, Mar. 2005.

Napoleon, Park Avenue Installation and Operation Instructions, Jul. 20, 2006.

Napoleon, The Madison Installation and Operation Instructions, May 24, 2005.

International Search Report and Written Opinion for Application No. PCT-US2008-056910, mailed Jul. 16, 2008.

Consumer Guide to Vent-Free Gas Supplemental Heating Products, est. 2007, pp. 10-11.

U.S. Appl. No. 12/724,353, filed Mar. 15, 2010, titled "Heater Configured to Operate With a First or Second Fuel", listing David Deng as inventor.

European Search Report for European Application No. 07009672.2 dated Mar. 29, 2012.

* cited by examiner

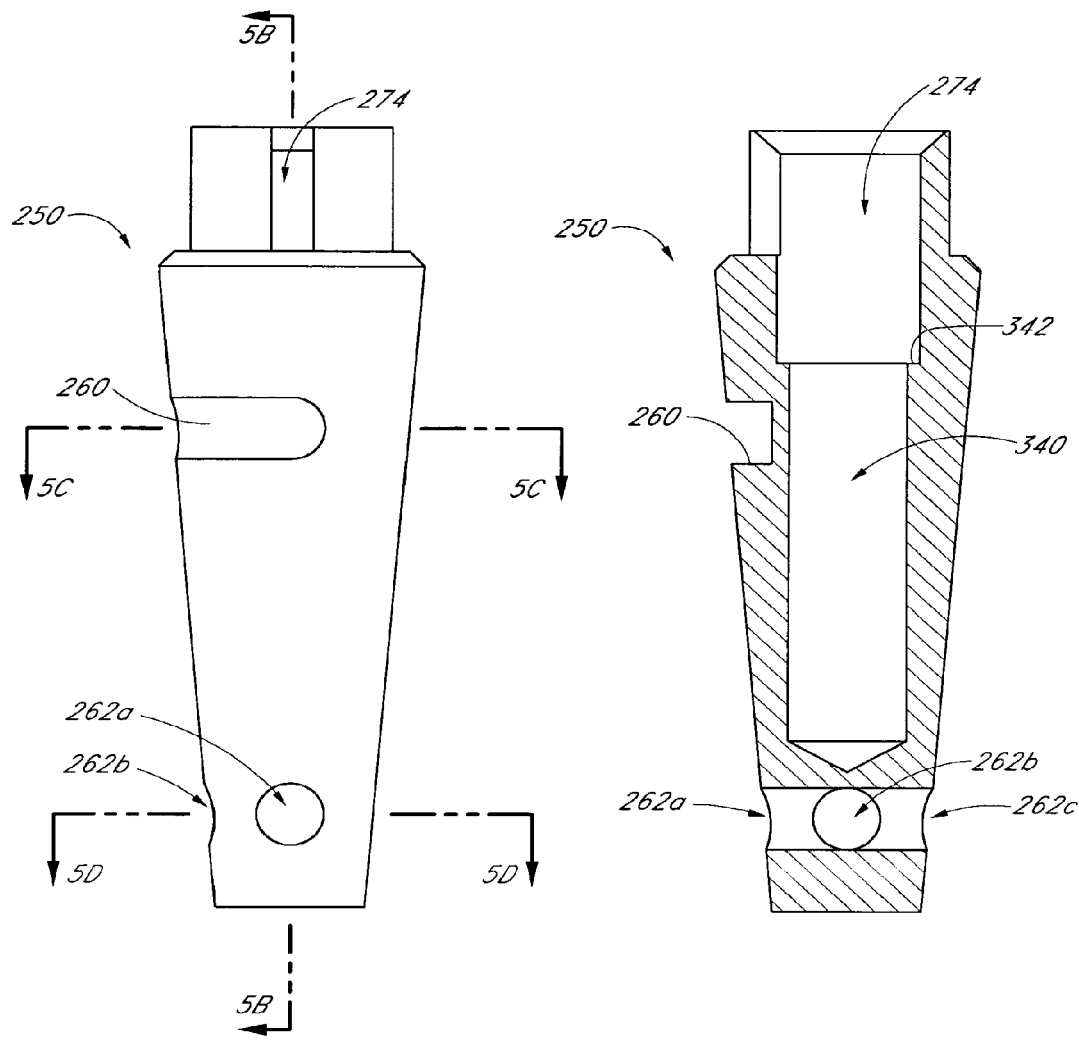
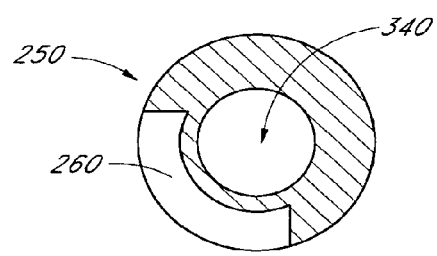 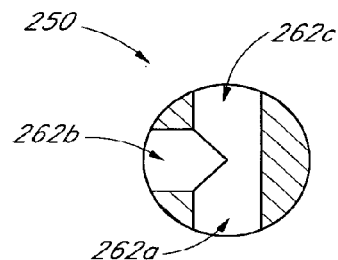
FIG. 5A     FIG. 5B
FIG. 5C     FIG. 5D

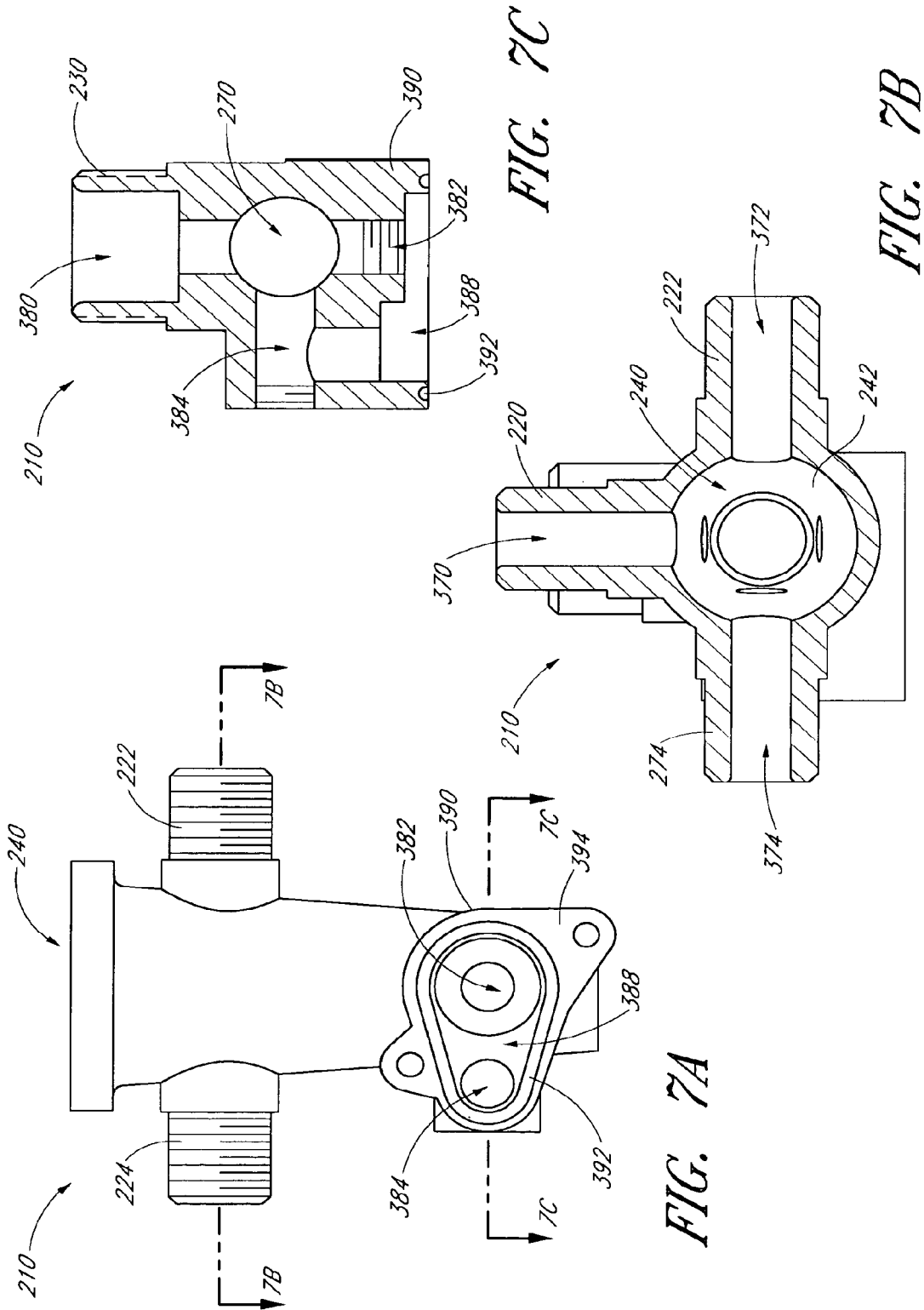

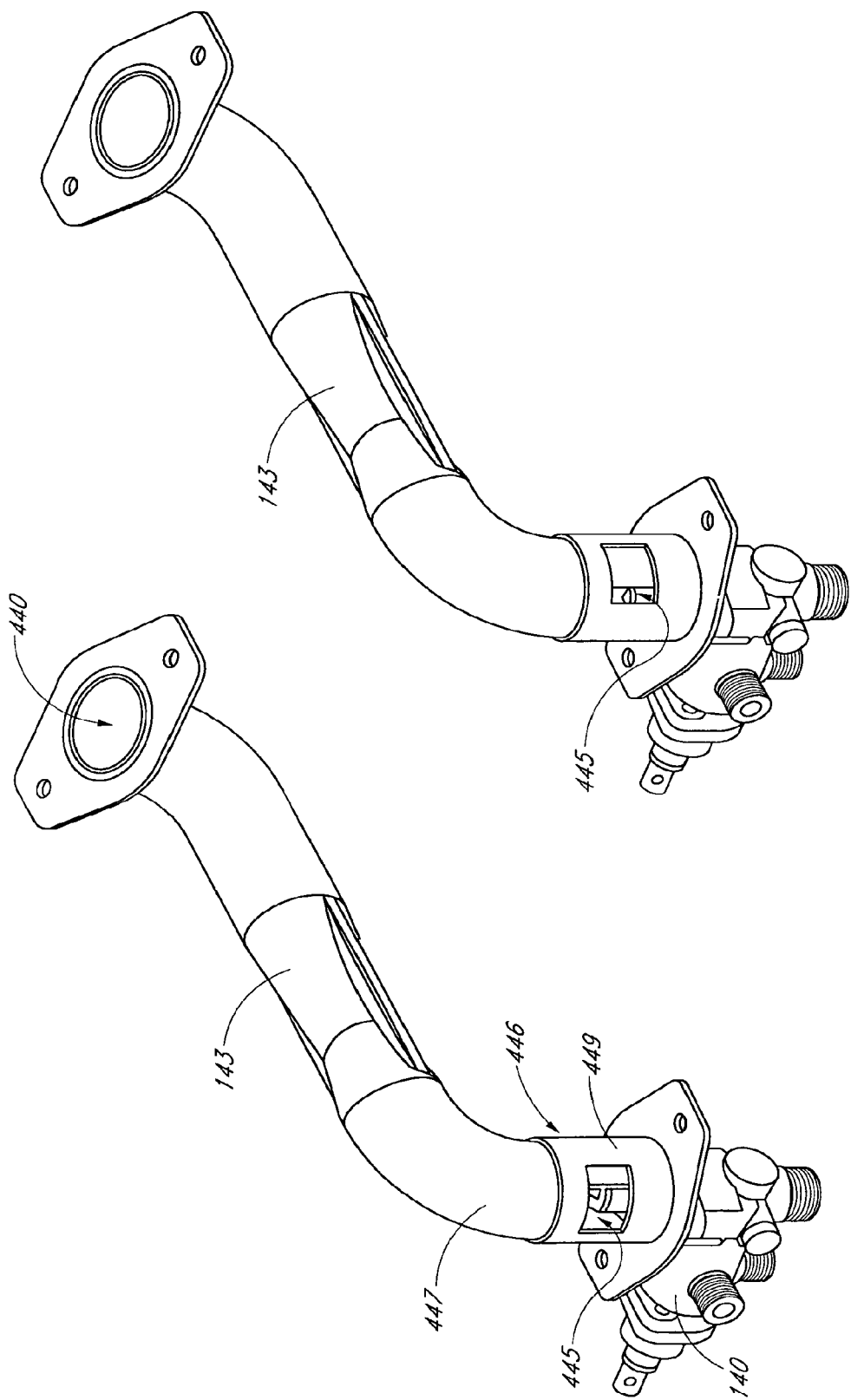

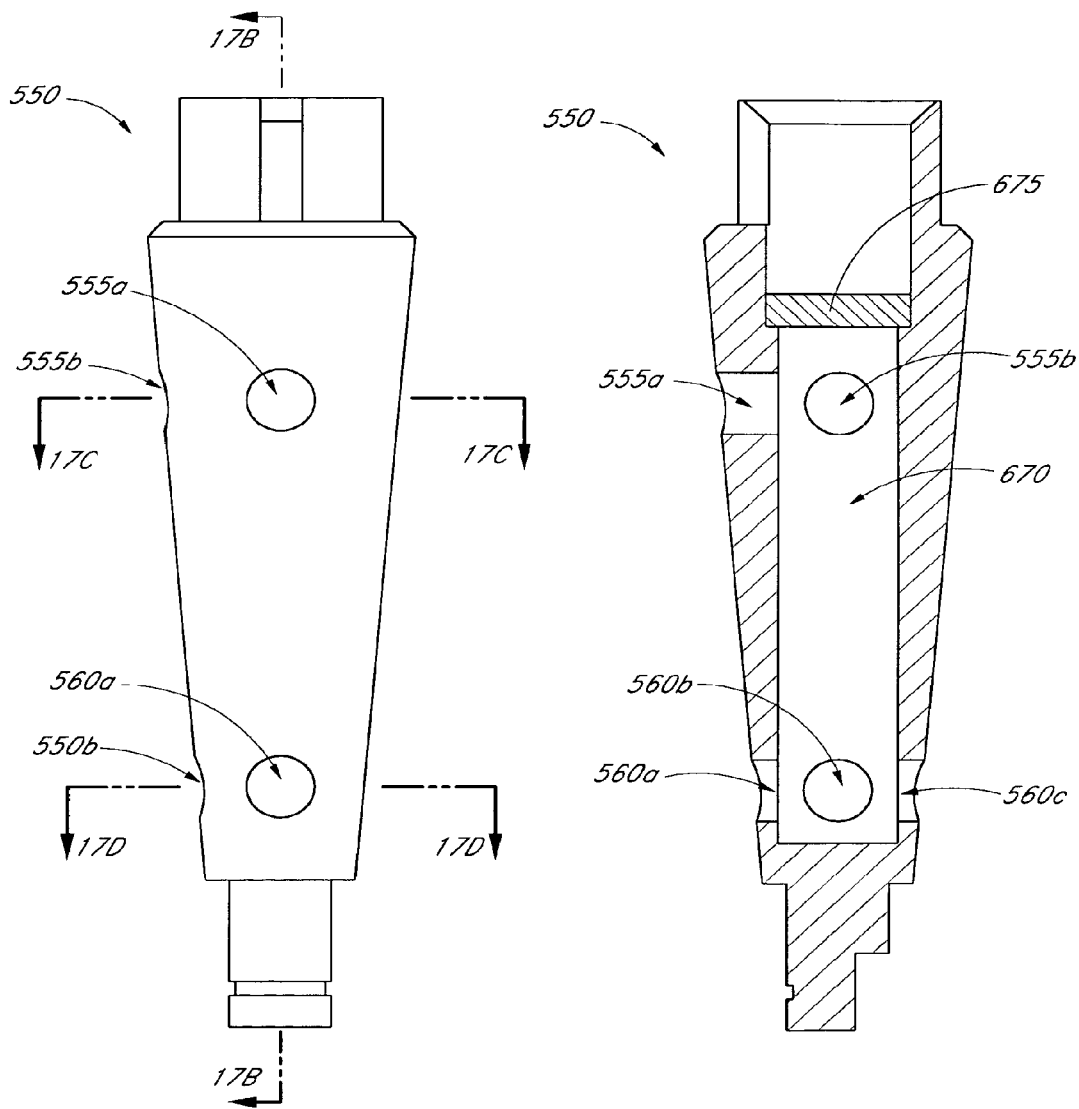
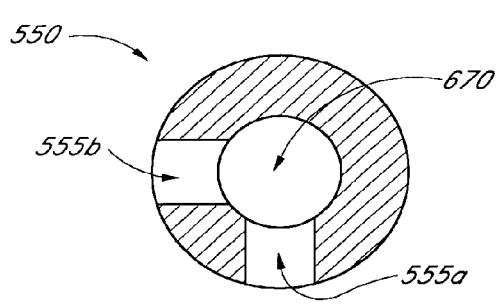
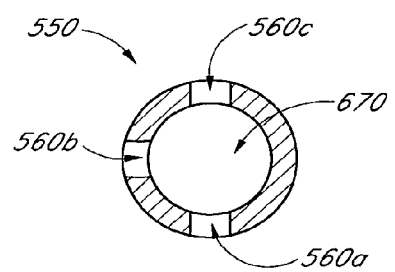
FIG. 17A  FIG. 17B
FIG. 17C  FIG. 17D

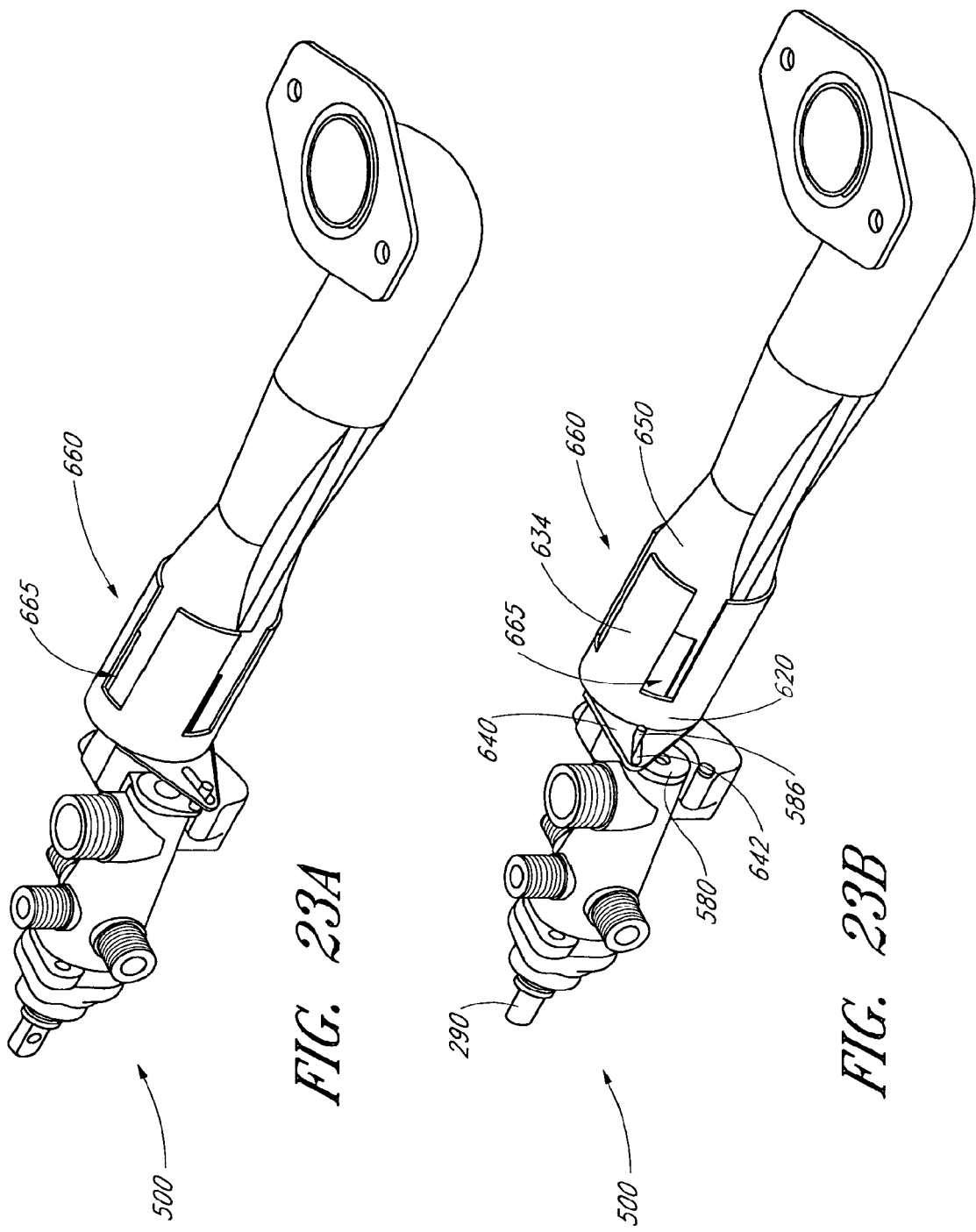

PILOT ASSEMBLIES FOR HEATING DEVICES

CROSS-REFERENCE TO RELATED APPLICATIONS

This application is a continuation of application Ser. No. 11/649,976, filed Jan. 5, 2007, titled VALVE ASSEMBLIES FOR HEATING DEVICES, which claims the benefit under 35 U.S.C.§119(e) of U.S. Provisional Application No. 60/871,761, filed Dec. 22, 2006, titled VALVE ASSEMBLIES FOR HEATING DEVICES; the entire contents of all of which are hereby incorporated by reference herein and made a part of this specification.

BACKGROUND OF THE INVENTIONS

1. Field of the Inventions

Certain embodiments disclosed herein relate generally to heating devices, and relate more specifically to fluid-fueled heating devices 2. Description of the Related Art Many varieties of heaters, fireplaces, stoves, and other heating devices utilize pressurized, combustible fuels. Some such devices operate with liquid propane, while others operate with natural gas. However, such devices and certain components thereof have various limitations and disadvantages

SUMMARY OF THE INVENTIONS

In certain embodiments, an apparatus can comprise a dual fuel pilot assembly. The dual fuel pilot assembly can comprise a first fuel dispenser configured to deliver a first fuel, a second fuel dispenser configured to deliver a second fuel different from the first; and at least one of a thermocouple configured to couple with a feedback line, and a thermopile configured to couple with a power line. Heat from combustion of either the first fuel or the second fuel can be directed toward the at least one of the thermocouple and the thermopile.

In some embodiments an apparatus can include a pilot assembly. The pilot assembly can comprise a first fuel dispenser, a second fuel dispenser, an igniter and at least one of a thermocouple, and a thermopile. The pilot assembly can be configured to direct heat from combustion of one of either a first or a second fuel to the at least one of the thermocouple and the thermopile. In some embodiments, the first dispenser can include a plurality of first ports and the second dispenser can include a plurality of second ports.

According to some embodiments an apparatus can include a pilot assembly. The pilot assembly can comprise a first fuel dispenser, a second fuel dispenser, an igniter and at least one of a thermocouple, and a thermopile. The first fuel dispenser can be in fluid communication with a first pilot delivery line. The second fuel dispenser can be in fluid communication with a second pilot delivery line. The igniter can connect to an igniter line. The thermocouple can connect to a feedback line. The thermopile can connect to a power line.

Certain embodiments of apparatus comprise a pilot assembly where the pilot assembly includes a first fuel dispenser that can be configured to couple with a first pilot delivery line and deliver a first fuel, a second fuel dispenser that can be configured to couple with a second pilot delivery line and deliver a second fuel, and an electrode or igniter that can be configured to couple with an igniter line. The pilot assembly may further include at least one of a thermocouple configured to couple with a feedback line, and a thermopile configured to couple with a power line.

BRIEF DESCRIPTION OF THE DRAWINGS

FIG. 5A is a front elevation view of an embodiment of a valve body compatible with the valve assembly of FIG. 3.

FIG. 5B is a cross-sectional view of the valve body of FIG. 5A taken along the view line 5B-5B.

FIG. 5C is a cross-sectional view of the valve body of FIG. 5A taken along the view line 5C-5C.

FIG. 5D is a cross-sectional view of the valve body of FIG. 5A taken along the view line 5D-5D.

FIG. 7A is a front elevation view of an embodiment of a housing compatible with the valve assembly of FIG. 3.

FIG. 7B is a cross-sectional view of the housing of FIG. 7A taken along the view line 7B-7B.

FIG. 7C is a cross-sectional view of the housing of FIG. 7A taken along the view line 7C-7C.

FIG. 13A is a perspective view of the valve assembly of FIG. 3 coupled with a fuel delivery line having an air intake.

FIG. 13B is a perspective view of the valve assembly of FIG. 3 coupled with a fuel delivery line having a smaller air intake than that shown in FIG. 13A.

FIG. 17A is a front elevation view of an embodiment of a valve body compatible with the valve assembly of FIG. 15.

FIG. 17B is a cross-sectional view of the valve body of FIG. 17A taken along the view line 17B-17B.

FIG. 17C is a cross-sectional view of the valve body of FIG. 17A taken along the view line 17C-17C.

FIG. 17D is a cross-sectional view of the valve body of FIG. 17A taken along the view line 17D-17D.

FIG. 23A is a perspective view of the valve assembly coupled with a fuel delivery line showing the valve assembly in the first operational configuration.

FIG. 23B is a perspective view of the valve assembly coupled with a fuel delivery line showing the valve assembly in the second operational configuration.

DETAILED DESCRIPTION OF THE PREFERRED EMBODIMENTS

Figure 1:
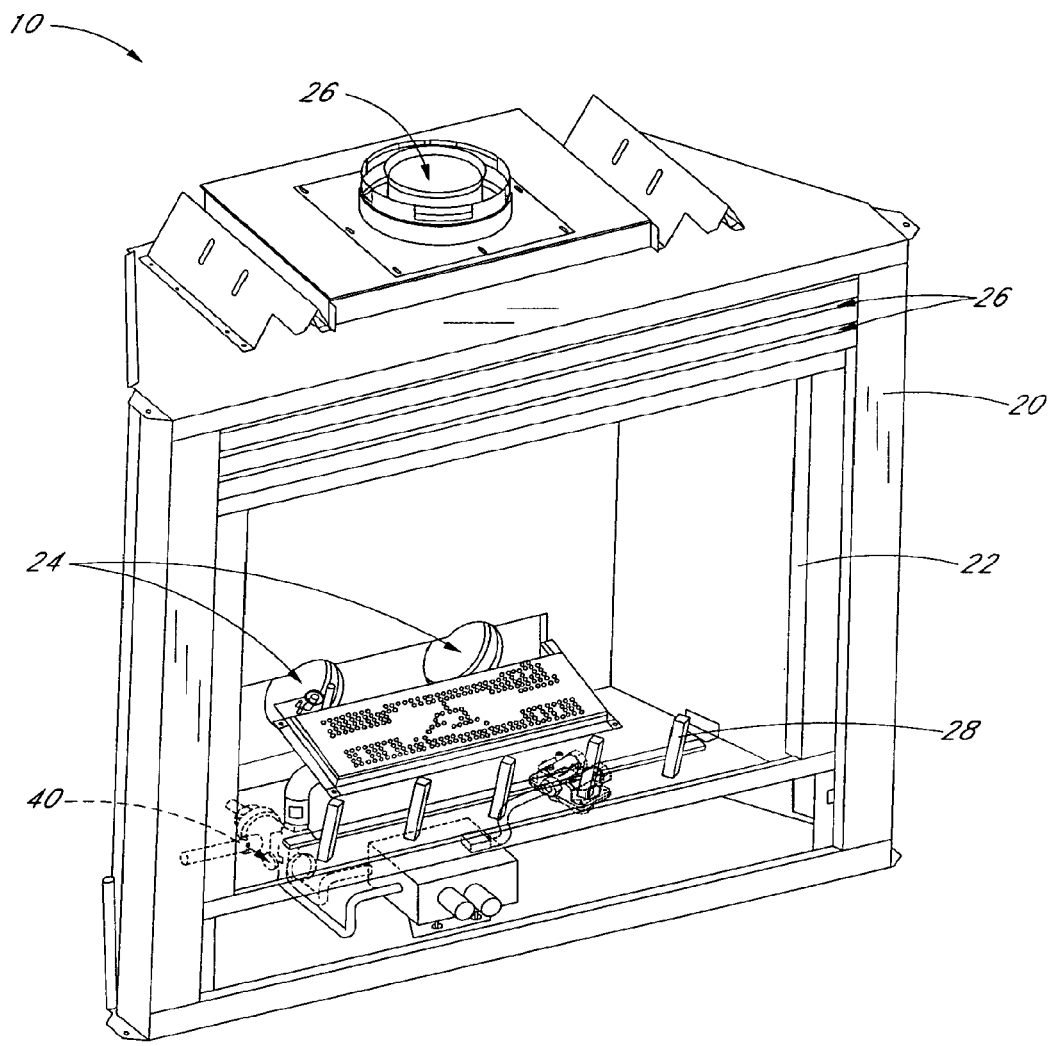
FIG. 1 is a perspective view of an embodiment of a heating device.

Many varieties of space heaters, wall heaters, stoves, fireplaces, fireplace inserts, gas logs, and other heat-producing devices employ combustible fluid fuels, such as liquid propane and natural gas. The term "fluid," as used herein, is a broad term used in its ordinary sense, and includes materials or substances capable of fluid flow, such as, for example, one or more gases, one or more liquids, or any combination thereof. Fluid-fueled units, such as those listed above, generally are designed to operate with a single fluid fuel type at a specific pressure or within a range of pressures. For example, some fluid-fueled heaters that are configured to be installed on a wall or a floor operate with natural gas at a pressure in a range from about 3 inches of water column to about 6 inches of water column, while others are configured to operate with liquid propane at a pressure in a range from about 8 inches of water column to about 12 inches of water column. Similarly, some gas fireplaces and gas logs are configured to operate with natural gas at a first pressure, while others are configured to operate with liquid propane at a second pressure that is different from the first pressure. As used herein, the terms "first" and "second" are used for convenience, and do not connote a hierarchical relationship among the items so identified, unless otherwise indicated.

In many instances, the operability of such fluid-fueled units with only a single fuel source is disadvantageous for distributors, retailers, and/or consumers. For example, retail stores often try to predict the demand for natural gas units versus liquid propane units over a given period of time, and consequently stock their shelves and/or warehouses with a percentage of each variety of unit. If such predictions prove incorrect, stores can be left with unsold units when the demand for one type was less than expected. On the other hand, some potential customers can be left waiting through shipping delays or even be turned away empty-handed when the demand for one type of unit was greater than expected. Either case can result in financial and other costs to the stores. Additionally, consumers can be disappointed to discover that the styles or models of heaters, fireplaces, stoves, or other fluid-fueled units with which they wish to furnish their homes are incompatible with the type of fuel with which their homes are serviced. This situation can result in inconveniences and other costs to the consumers. Accordingly, fluid-fueled devices configured to operate with more than one fuel source (e.g., with either a natural gas or a liquid propane fuel source) would be desirable, as such devices could alleviate and/or resolve at least the foregoing problems.

In further instances, the appearance of a flame produced by certain embodiments of fluid-fueled units is important to the marketability of the units. For example, some gas fireplaces, gas logs, and fireplace inserts are desirable as either replacements for or additions to natural wood-burning fireplaces. Such replacement units can desirably exhibit enhanced efficiency, improved safety, and/or reduced mess. Furthermore, such heat-producing units can eliminate the need for venting systems, such as chimneys, which can be difficult to maintain, costly to install, or even infeasible in some cases. In many instances, a flame produced by such a replacement gas unit desirably resembles that produced by burning wood, and thus preferably has a substantially yellow hue.

Certain embodiments of fluid-fueled units can produce substantially yellow flames. The amount of oxygen present in the fuel at a combustion site of a unit (e.g., at a burner) can affect the color of the flame produced by the unit. Accordingly, in some embodiments, one or more components the unit are adjusted to regulate the amount of air that is mixed with the fuel to create a proper air/fuel mixture at the burner. Such adjustments can be influenced by the pressure at which the fuel is dispensed.

A particular challenge in developing some embodiments of fluid-fueled units that are operable with more than one fuel source (e.g., operable with either a natural gas or a liquid propane fuel source) arises from the fact that different fuel sources are generally provided at different pressures. Additionally, in many instances, different fuel types require different amounts of oxygen to create a substantially yellow flame. Certain advantageous embodiments disclosed herein provide structures and methods for configuring a fluid-fueled device to produce a yellow flame using any of a plurality of different fuel sources, and in further embodiments, for doing so with relative ease.

Certain embodiments disclosed herein reduce or eliminate one or more of the foregoing problems associated with fluid-fueled devices and/or provide some or all of desirable features detailed above. Although various embodiments described hereafter are presented in the context of vent-free devices, the apparatus and devices disclosed and enabled herein can benefit a wide variety of other applications, including, for example, direct vent systems.

FIG. 1 illustrates one embodiment of a fireplace, heat-generating unit, or heating device 10 configured to operate with one or more sources of combustible fuel. In various embodiments, the heating device 10 is configured to be installed on or within a wall, within a fireplace, on a floor, or in a variety of other static positions. In other embodiments, the heating device 10 is can be positioned in a variety of locations and/or is substantially portable.

In certain embodiments, the heating device 10 includes a housing 20. The housing 20 can include metal or some other suitable material for providing structure to the heating device 10 without melting or otherwise deforming in a heated environment. The housing 20 can define a window 22. In some embodiments, the window 22 defines a substantially open area through which heated air and/or radiant energy can pass. In other embodiments, the window 22 comprises a sheet of substantially clear material, such as tempered glass, that is substantially impervious to heated air but substantially transmissive to radiant energy.

The heating device 10 can have one or more intake vents 24 through which air can flow into the housing 20 and/or outlet vents 26 through which heated air can flow out of the housing 20. In some embodiments, the heating device 10 includes a grill 28. The grill 28 can provide a surface against which artificial logs may rest, and can resemble similar structures used in wood-burning fireplaces.

In certain embodiments, the heating device 10 includes a fuel delivery system 40, which can have portions for accepting fuel from a fuel source, for directing flow of fuel within the heating device 10, and for combusting fuel. In the embodiment illustrated in FIG. 1, portions of an embodiment of the fuel delivery system 40 that would be obscured by the heating device 10 are shown in phantom.

Figure 2:
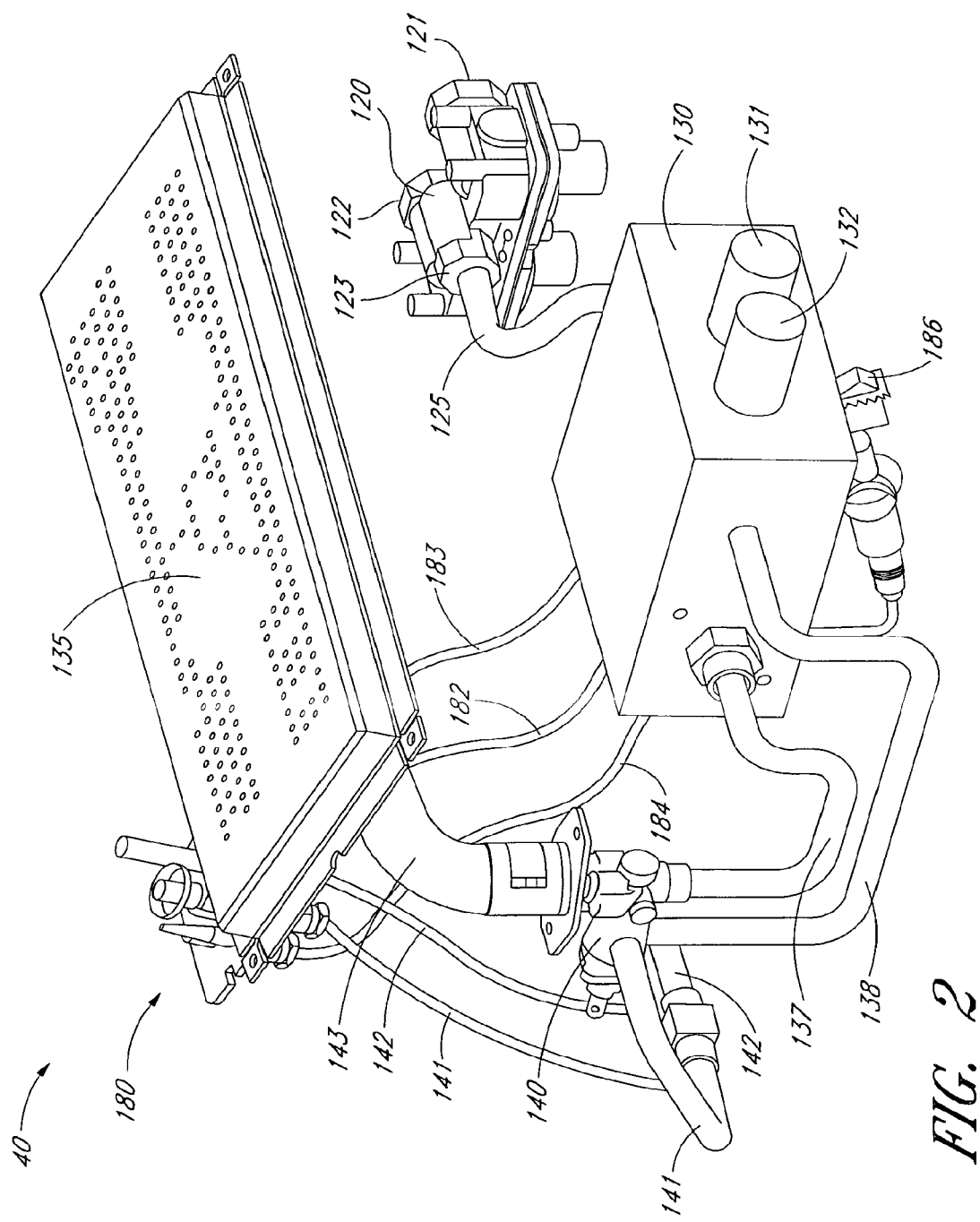
FIG. 2 is a perspective view of an embodiment of a fuel delivery system compatible with the heating device of FIG. 1.

With reference to FIG. 2, in certain embodiments, the fuel delivery system 40 includes a regulator 120. The regulator 120 can be configured to selectively receive either a first fluid fuel (e.g., natural gas) from a first source at a first pressure or a second fluid fuel (e.g., liquid propane) from a second source at a second pressure. In certain embodiments, the regulator 120 includes a first input port 121 for receiving the first fuel and a second input port 122 for receiving the second fuel. In some embodiments, the second input port 122 is configured to be plugged when the first input port 121 is coupled with the first fuel source, and the first input port 121 is configured to be plugged when the second input port 122 is coupled with a second fuel source.

The regulator 120 can define an output port 123 through which fuel exits the regulator 120. In certain embodiments, the regulator 120 is configured to regulate fuel entering the first port 121 such that fuel exiting the output port 123 is at a relatively steady first pressure, and is configured to regulate fuel entering the second port 122 such that fuel exiting the output port 123 is at a relatively steady second pressure. Various embodiments of regulators 120 compatible with certain embodiments of the fuel delivery system 40 described herein are disclosed in U.S. patent application Ser. No. 11/443,484, titled PRESSURE REGULATOR, filed May 30, 2006, the entire contents of which are hereby incorporated by reference herein and made a part of this specification.

In certain embodiments, the output port 123 of the regulator 120 is coupled with a source line 125. The source line 125, and any other fluid line described herein, can comprise piping, tubing, conduit, or any other suitable structure adapted to direct or channel fuel along a flow path. In some embodiments, the source line 125 is coupled with the output port 123 at one end and is coupled with a control valve 130 at another end. The source line 125 can thus provide fluid communication between the regulator 120 and the control valve 130.

In certain embodiments, the control valve 130 is configured to regulate the amount of fuel delivered to portions of the fuel delivery system 40. The control valve 130 can assume a variety of configurations, including those known in the art as well as those yet to be devised. The control valve 130 can comprise a first knob or dial 131 and a second dial 132. In some embodiments, the first dial 131 can be rotated to adjust the amount of fuel delivered to a burner 135, and the second dial 132 can be rotated to adjust a setting of a thermostat. In other embodiments, the control valve 130 comprises a single dial 131.

In many embodiments, the control valve 130 is coupled with a burner transport line 137 and an oxygen depletion sensor (ODS) transport line 138, each of which can be coupled with a valve assembly 140. In some embodiments, the valve assembly 140 is further coupled with a first ODS delivery line 141, a second ODS delivery line 142, and a burner delivery line 143. As described below, the valve assembly 140 can be configured to direct fuel received from the ODS transport line 138 to either the first ODS delivery line 141 or the second ODS delivery line 142, and can be configured to direct fuel received from the burner transport line 132 along different flow paths toward the burner delivery line 143.

In certain embodiments, the first and second ODS delivery lines 141, 142 are coupled with separate portions of an ODS 180. Fuel delivered to the ODS 180 can be combusted to form a pilot flame, which can serve to ignite fuel delivered to the burner 135 and/or serve as a safety control feedback mechanism that can cause the control valve 130 to shut off delivery of fuel to the fuel delivery system 40. Additionally, in some embodiments, the ODS 180 is configured to provide power to the thermostat of the control valve 130. Accordingly, in some embodiments, the ODS 180 is coupled with the control valve 130 by one or more of a feedback line 182 and a power line 183.

In further embodiments, the ODS 180 comprises an electrode configured to ignite fuel delivered to the ODS 180 via one or more of the ODS delivery lines 141, 142. Accordingly, the ODS 180 can be coupled with an igniter line 184, which can be connected to an igniter switch 186. In some embodiments, the igniter switch 186 is mounted to the control valve 130. In other embodiments, the igniter switch 186 is mounted to the housing 20 of the heating device 10. Any of the lines 182, 183, 184 can comprise any suitable medium for communicating an electrical quantity, such as a voltage or an electrical current. For example, in some embodiments, one or more of the lines 182, 183, 184 comprise a metal wire.

In certain embodiments, the burner delivery line 143 is situated to receive fuel from the valve assembly 140, and can be connected the burner 135. The burner 135 can comprise any suitable burner, such as, for example, a ceramic tile burner or a blue flame burner, and is preferably configured to continuously combust fuel delivered via the burner delivery line 143.

In certain embodiments, either a first or a second fuel is introduced into the fuel delivery system 40 through the regulator 120. In some embodiments, the first or the second fuel proceeds from the regulator 120 through the source line 125 to the control valve 130. In some embodiments, the control valve 130 can permit a portion of the first or the second fuel to flow into the burner transport line 132, and can permit another portion of the first or the second fuel to flow into the ODS transport line 134.

In some embodiments, the first or the second fuel can proceed to the valve assembly 140. In many embodiments, the valve assembly 140 is configured to operate in either a first state or a second state. In some embodiments, the valve assembly 140 directs fuel from the burner transport line 132 along a first flow path into the burner delivery line 143 and directs fuel from the ODS transport line 138 to the first ODS delivery line 141 when the valve assembly 140 is in the first state. In further embodiments, the valve assembly 140 is configured to channel fuel from the burner transport line 132 along a second flow path into the burner delivery line 143 and from the ODS transport line 138 to the second ODS delivery line 142 when the valve assembly 140 is in the second state.

In some embodiments, when the valve assembly 140 is in the first state, fuel flows through the first ODS delivery line 141 to the ODS 180, where it is combusted. When the valve assembly 140 is in the second state, fuel flows through the second ODS delivery line 142 to the ODS 180, where it is combusted. In some embodiments, when the valve assembly 140 is in either the first or second state, fuel flows through the burner delivery line 143 to the burner 190, where it is combusted.

Figure 3:
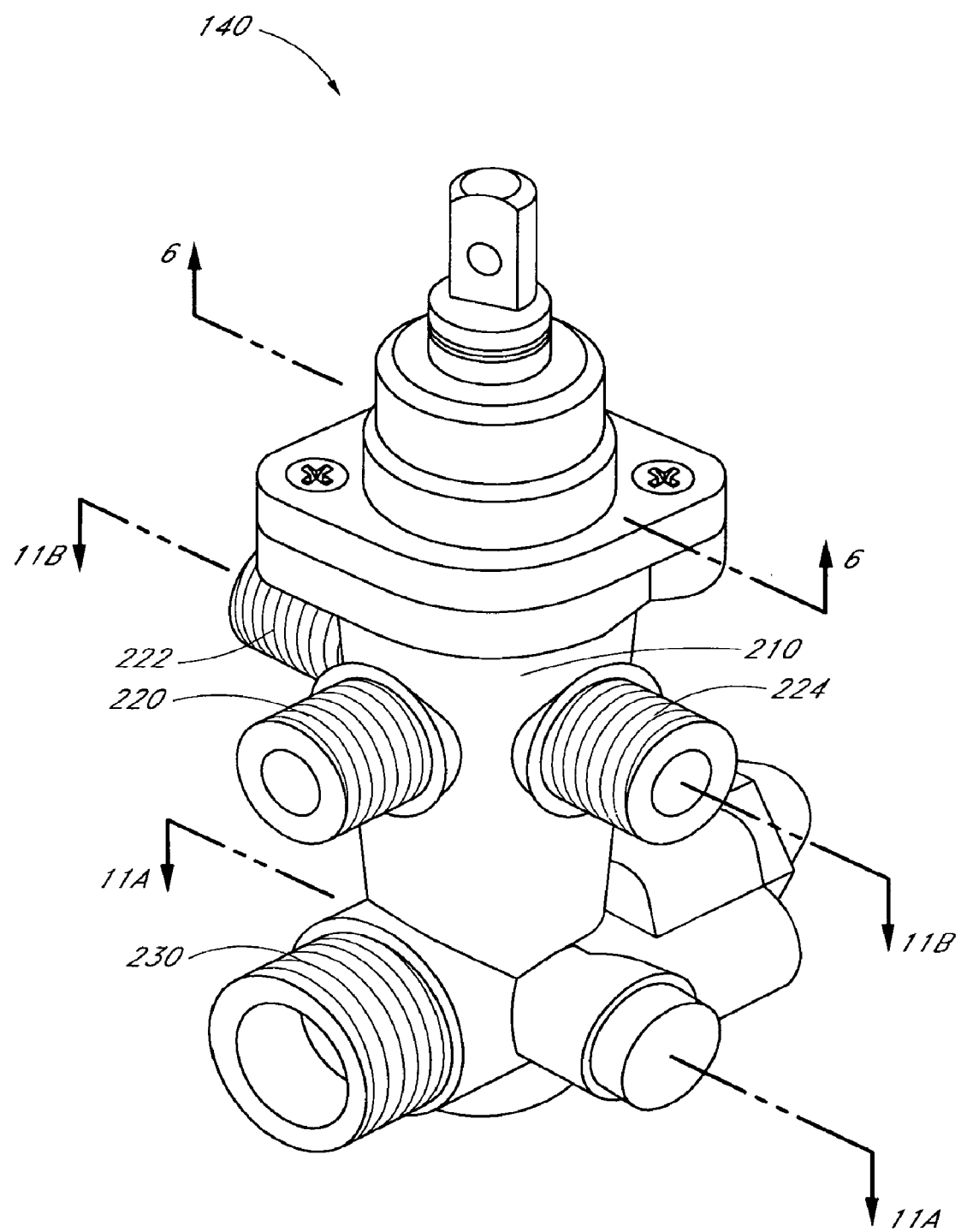
FIG. 3 is a perspective view of an embodiment of a valve assembly compatible with, for example, the fuel delivery system of FIG. 2.

With reference to FIG. 3, in certain embodiments, the valve assembly 140 includes a housing 210. The housing 210 can comprise a unitary piece of material, or can comprise a multiple pieces joined in any suitable manner. In certain embodiments, the housing 210 defines one or more inlets, inputs, receiving ports, outlets, outputs, delivery ports, flow paths, pathways, or passageways through which fuel can enter, flow through, and/or exit the valve assembly 140. In some embodiments, the housing 210 defines an ODS input 220 configured to couple with the ODS transport line 138 and to receive fuel therefrom. The housing 210 can define a first ODS output 222 configured to couple with first ODS delivery line 141 and to deliver fuel thereto, and can define a second ODS output 224 configured to couple with the second ODS delivery line 142 and to deliver fuel thereto.

Each of the ODS input 220 and the first and second ODS outputs 222, 224 can define a substantially cylindrical protrusion, and can include threading or some other suitable connection interface. In some embodiments, the ODS input 220 and the first and second ODS outputs 222, 224 are substantially coplanar. The first ODS output 222 can define a first longitudinal axis that is substantially collinear with a second longitudinal axis defined by the second ODS output 224, and in some embodiments, the ODS input 220 defines a longitudinal axis that intersects a line through the first and second longitudinal axes at an angle. In some embodiments, the angle is about 90 degrees. Other configurations of the ODS input 220 and outputs 222, 224 are possible.

In some embodiments, the housing 210 defines a burner input 230 configured to couple with the burner transport line 137 and to receive fuel therefrom. In some embodiments, the burner input 230 defines a substantially cylindrical protrusion, which can include threading or any other suitable connection interface. In some embodiments, the burner input 230 is larger than the ODS input 220, and can thus be configured to receive relatively more fuel. In some embodiments, the burner input 230 defines a longitudinal axis that is substantially parallel to a longitudinal axis defined by ODS input 220. Other configurations of the burner input 230 are also possible.

Figure 4:
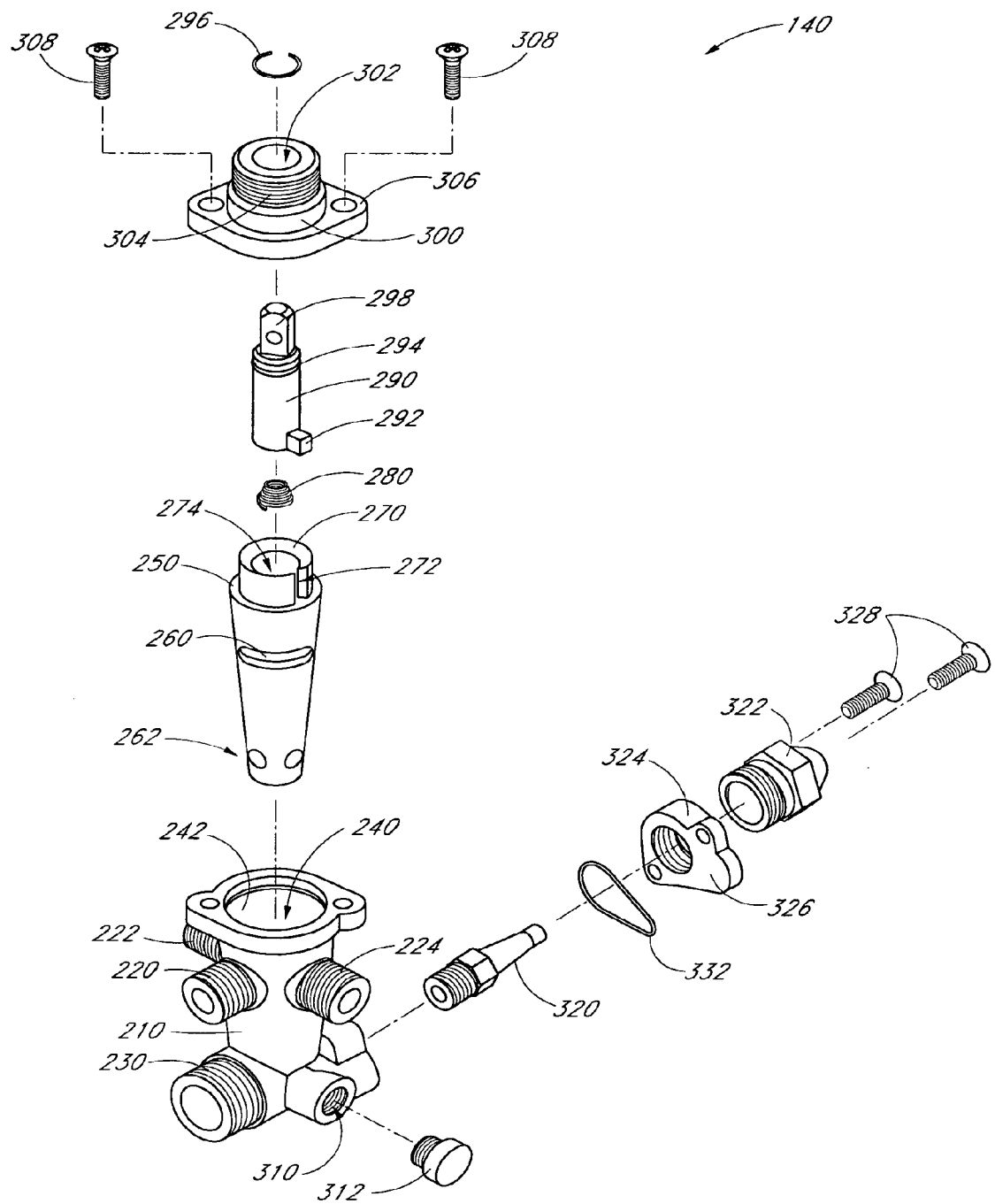
FIG. 4 is an exploded perspective view of the valve assembly of FIG. 3.

With reference to FIG. 4, in certain embodiments, the housing 210 defines a chamber 240. In some embodiments, each of the burner input 230, the ODS input 220, and the ODS outputs 222, 224 defines a passageway leading into the chamber 240 such that the chamber 240 can be in fluid communication with any of the inputs 220, 230 and outputs 222, 224. In some embodiments, chamber 240 is defined by a substantially smooth inner sidewall 242 of the housing 210. The inner sidewall 242 can define any suitable shape, and in some embodiments, is rotationally symmetric. In various embodiments, the inner sidewall is substantially frustoconical or substantially cylindrical. The chamber 240 can thus be sized and shaped to receive a valve member, core, fluid flow controller, or valve body 250.

In some embodiments, the valve body 250 includes a lower portion 252 that defines an outer surface which is substantially complementary to the inner sidewall 242 of the housing 210. Accordingly, in some embodiments, the valve body 250 can form a substantially fluid-tight seal with the housing 210 when seated therein. In some embodiments, the valve body 250 is configured to rotate within the chamber 240. A suitable lubricant is preferably included between the valve body 250 and the inner sidewall 242 of the housing 210 in order to permit relatively smooth movement of the valve body 250 relative to the housing 210. The valve body 250 can define a channel 260 configured to direct fuel from the ODS input 220 to either the first or second ODS output 222, 224, and can include a series of apertures, openings, or ports 262 configured to direct fuel from the burner input 230 along either of two separate flow paths toward the burner delivery line 143, as further described below.

In some embodiments, the valve body 250 includes an upper portion 270, which can be substantially collar-shaped, and which can include a chamfered upper surface. In some embodiments, the upper portion 270 defines a longitudinal slot 272 and/or can define at least a portion of an upper cavity 274.

In some embodiments, a biasing member 280 is configured to be received by the upper cavity 274 defined by the valve body 250. The biasing member 280 can comprise, for example, a spring or any other suitable resilient element. In some embodiments, the biasing member 280 defines a substantially frustoconical shape and can be oriented such that a relatively larger base thereof is nearer the lower portion of the valve body 250 than is a smaller top thereof. References to spatial relationships, such as upper, lower, top, etc., are made herein merely for convenience in describing embodiments depicted in the figures, and should not be construed as limiting. For example, such references are not intended to denote a preferred gravitational orientation of the valve assembly 140.

In some embodiments, an actuator, rod, column, or shaft 290 is configured to be received by the upper cavity 274 defined by the valve body 250. In some embodiments, the biasing member 280 is retained between a ledge defined by the valve body 250 (shown in FIG. 5B) and the shaft 290, thus providing a bias that urges the shaft 290 upward, or away from the valve body 290, in the assembled valve assembly 140. In certain embodiments, the shaft 290 defines a protrusion 292 sized and shaped be received by the slot 272 defined by the valve body 250. In some embodiments, the protrusion 292 is sized to fit within the slot 272 with relatively little clearance or, in other embodiments, snugly, such that an amount of rotational movement by the protrusion 292 closely correlates with an amount of rotation of the valve body 250. In some embodiments, the protrusion 292 is substantially block-shaped, and projects at a substantially orthogonally with respect to a longitudinal length of a substantially columnar body of the shaft 290. In some embodiments, the protrusion 292 is capable of longitudinal movement within the slot 272, and can be capable of rotating the valve body 250 at any point within the range of longitudinal movement.

In some embodiments, the shaft 290 defines a channel 294 sized and shaped to receive a split washer 296. The shaft 290 can define an extension 298. In some embodiments, the extension 298 defines two substantially flat and substantially parallel sides configured to be engaged by a clamping device, such as a pair of pliers, such that the shaft 290 can be rotated. In other embodiments, the extension 298 is configured to couple with a knob or some other suitable grippable device, and in some embodiments, defines only one flat surface. Other configurations of the shaft 290 are also possible.

In some embodiments, the shaft 290 extends through a cap 300 in the assembled valve assembly 140. The cap 300 can define an opening 302 sized and shaped to receive the shaft 290 and to permit rotational movement of the shaft 290 therein. In some embodiments, the split washer 296 prevents the shaft 290 from being forced downward and completely through the opening 302 in the assembled valve assembly 140.

The cap 300 can include a neck 304, which can be threaded to engage a collar or cover. In some embodiments, the cap 300 defines a flange 306 through which fasteners 308, such as, for example, screws, can be inserted to connect the cap 300 with the housing 210.

In some embodiments, the housing 210 defines an opening 310, which in some embodiments, results from the drilling or boring of a flow channel within the housing 210, as described below. In some embodiments, the opening 310 is sealed with a plug 312, which in some embodiments, includes a threaded portion configured to interface with an inner surface of the housing 210 that defines the flow channel. In some embodiments, glue, epoxy, or some other suitable bonding agent is included between the plug 312 and the housing 210 in order to ensure that a substantially fluid-tight seal is created.

In certain embodiments, the housing 210 is configured to be coupled with a nozzle element, fuel director, fuel dispenser, or first nozzle member 320, a second nozzle member 322, and/or a cover 324, as further described below. In some embodiments, the cover 324 defines a flange 326 through which fasteners 328, such as, for example, screws, can be inserted to connect the cover 324 with the housing 210. In further embodiments, a sealing member or gasket 332 is coupled with the housing 210 in order to create a substantially fluid-tight seal, as further described below.

With reference to FIGS. 5A-5D, in certain embodiments, the valve body 250 defines three burner ports 262a, b, c configured to permit the passage of fuel. In some embodiments, the ports 262a, b, c are formed by drilling or boring two flow channels into a solid portion of the valve body 250. In some embodiments, one of the flow channels extends from one side of the valve body 250 to an opposite side thereof, and the other flow channel extends from another side of the valve body 250 and intersects the first flow channel within the valve body 250. In some embodiments, the ports 262a, b, c are substantially coplanar, and in further embodiments, are coplanar along a plane that is substantially orthogonal to a longitudinal axis of the valve body 250.

In some embodiments, the valve body 250 is substantially hollow, and can define a lower cavity 340 which can reduce the material costs of producing the valve body 250. The lower cavity 340 can have a perimeter (e.g. circumference) smaller than a perimeter of the upper cavity 274. Accordingly, in some embodiments, the valve body 250 defines a ledge 342 against which the biasing member 280 can rest.

As described above, the valve body 250 can define a groove or a channel 260 configured to direct fuel flow. In some embodiments, the channel 260 is milled or otherwise machined into a side of the valve body 250. In some embodiments, a first end of the channel 260 is substantially aligned with the port 262a along a plane through a first longitudinal axis of the valve body 250, and a second end of the channel 260 is substantially aligned with the port 263b along a second plane through a longitudinal axis of the valve body 250. In some embodiments, the first plane and the second plane are substantially orthogonal to each other.

In other embodiments, the valve body 250 does not include a lower cavity 340 such that the valve body 250 is substantially solid. Ports similar to the ports 262a, b, c can thus be created in the valve body 250 in place of the channel 260. Other configurations of the valve body 250 are also possible.

Figure 6:
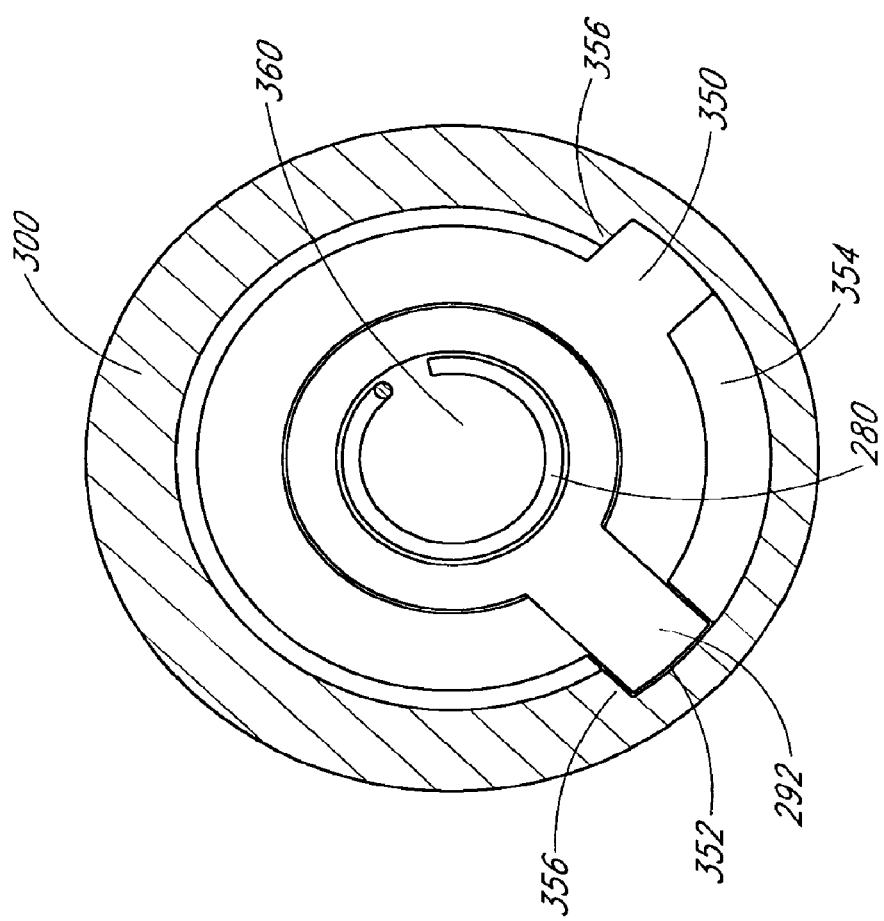
FIG. 6 is a cross-sectional view of the valve assembly of FIG. 3 taken along the view line 6-6.

With reference to FIG. 6, in certain embodiments, the cap 300 defines a channel, slot, or first depression 350 and a second depression 352. In some embodiments, the first and second depressions 350, 352 are sized and shaped to receive a portion of the protrusion 292 defined by the shaft 290. The first and second depressions 350, 352 can define an angle relative to a center of the cap 300. In preferred embodiments, the angle is about 90 degrees. Other angles are also possible, including, for example, between about 30 degrees and about 270 degrees, between about 45 and about 180 degrees, and between about 60 and about 120 degrees; no less than about 30 degrees, about 45 degrees, about 60 degrees, and about 90 degrees; and no greater than about 270 degrees, about 180 degrees, about 120 degrees, and about 90 degrees. The first and second depressions 350, 352 can be separated by a relatively short shelf or ledge 354. In some embodiments, the first and second depressions 350, 352 are also separated by a stop 356, which can be defined by an extension of the cap 300.

In some embodiments, the shaft 290 defines a receptacle 360 configured to receive a portion of the biasing member 280. In some embodiments, the receptacle 360 contacts the top end of the biasing member 280, and the biasing member 280 urges the shaft 290 upward toward the cap 300. Accordingly, in some embodiments, the protrusion 292 of the shaft 290 is naturally retained within one of the depressions 350, 352 by the bias provided by the biasing member 280, and the shaft 290 is displaced downward or depressed in order to rotate the shaft 290 such that the protrusion 292 moves to the other depression 350, 352. Movement past either of the depressions 350, 352 can be prevented by the stop 356. As noted above, in many embodiments, movement of the protrusion 292 can result in correlated movement of the valve body 250. Accordingly, rotation of the shaft 290 between the first and second depressions 350, 352 can rotate the valve body 250 between a first and a second operational state, as described further below.

FIGS. 7A-7C illustrate an embodiment of the housing 210. With reference to FIGS. 7A and 7B, in certain embodiments, the ODS input 220 defines at least a portion of a channel, conduit, passageway, or flow path 370 along which fuel can flow toward the chamber 240. The ODS output 222 can define at least a portion of a flow path 372, and the ODS output 224 can define at least a portion of a flow path 374, along which fuel can flow away from the chamber 240 and out of the housing 210. In some embodiments, the flow paths 372, 374 define longitudinal axes that are substantially collinear. In some embodiments, a longitudinal axis of the flow path 370 is substantially orthogonal to one or more of the flow paths 372, 374. Other arrangements are also possible.

With reference to FIGS. 7A and 7C, in some embodiments, the burner input 230 of the housing 210 defines at least a portion of a flow path 380 along which fuel can flow toward the chamber 240. The housing 210 can define a first egress flow path 382 along which fuel can flow away from the chamber 240 and out of the housing 240. In some embodiments, an inner surface of the portion of the housing 210 that defines the egress flow path 382 can be threaded or include any other suitable connection interface for coupling with the first nozzle member 320, as further described below. The housing 210 can define a second egress flow path 384 along which fuel can flow away from the chamber 240 and out of the housing 240. In certain embodiments, the housing 210 defines an indentation, cavity, or recess 388. In some embodiments, the recess 388 defines a portion of the second egress flow path 384.

In some embodiments, the recess 388 is defined by a projection 390 of the housing 210. The projection 390 can further define a channel 392 for receiving the gasket 332 to thereby form a substantially fluid-tight seal with the cover 324. In some embodiments, a face 394 of the projection 390 is substantially flat, and can be configured to abut the cover 324. The face 394 can define apertures through which fasteners can be advanced for coupling the cover 324 with the housing 210. In some embodiments, the face 394 defines a plane that is substantially parallel to a longitudinal axis defined by the inner sidewall 242 of the housing 210.

Figure 8:
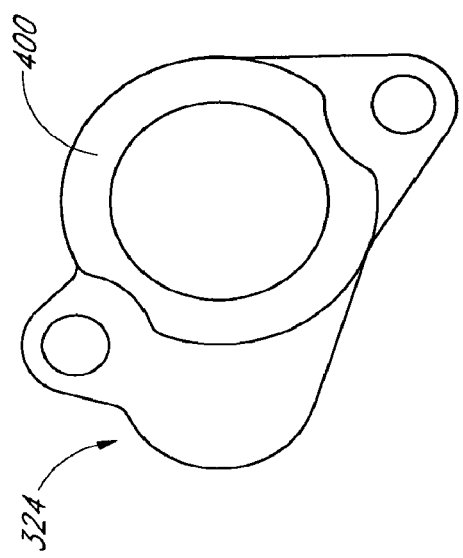
FIG. 8 is a top plan view of an embodiment of a cover compatible with the valve assembly of FIG. 3.

With reference to FIG. 8, in certain embodiments, the cover 324 is sized and shaped such that a periphery thereof substantially conforms to a periphery of the face 394 of the housing 210. Accordingly, an edge around the cover 324 and the face 394 can be substantially smooth when the cover 324 is coupled with the housing 210. In some embodiments, an underside of the cover 324 is substantially flat (see FIG. 4), and can thus be in relatively close proximity to the flat face 394 of the housing when coupled therewith. In some embodiments, the cover 324 defines a collar 400 configured to receive a portion of the second nozzle member 322. The collar 400 can include threading or any other suitable connection interface, which can be disposed along an interior surface thereof.

Figure 9:
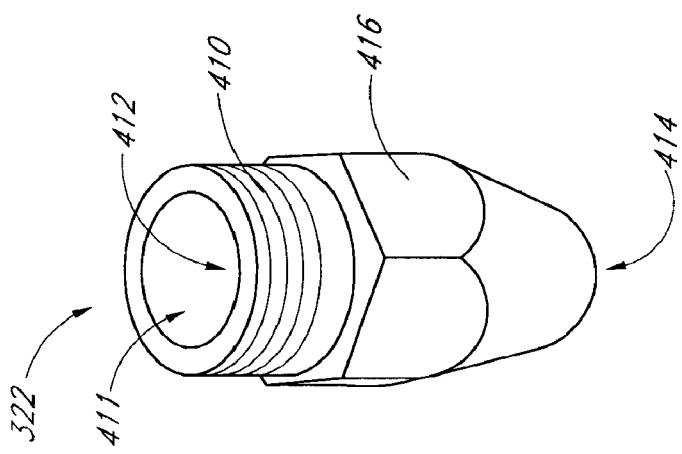
FIG. 9 is a perspective view of an embodiment of a nozzle member compatible with the valve assembly of FIG. 3.

With reference to FIG. 9, in certain embodiments, the second nozzle member 322 can include a rim 410 configured to couple with the collar 400 of the cover 324. In some embodiments, the rim 410 defines an inlet 411 of the second nozzle member 322 through which fuel can be accepted into the nozzle member 322. The rim 410 can comprise threading or any other suitable connection interface along an interior or exterior surface thereof. The rim 410 can define at least a portion of a cavity 412, which in some embodiments, is sufficiently large to receive at least a portion of the first nozzle member 320. In some embodiments, the cavity 412 extends through the full length of the second nozzle member 322, and can define an outlet 414 (see also FIG. 11A) at an end opposite the rim 410. In some embodiments, the second nozzle member 322 defines a tightening interface 416 configured to be engaged by a tightening device in order to securely couple the second nozzle member 322 with the cover 324.

Figure 10:
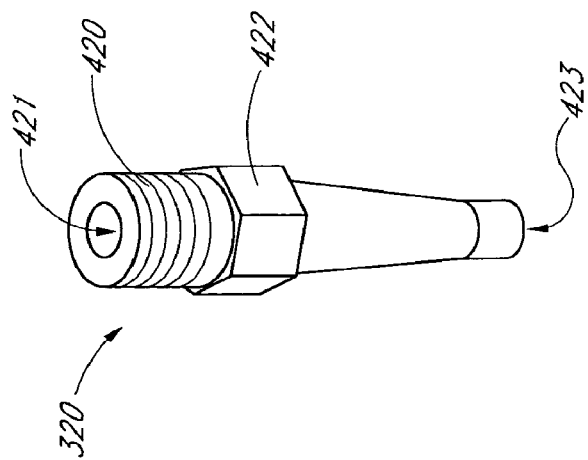
FIG. 10 is a perspective view of an embodiment of a nozzle member compatible with the valve assembly of FIG. 3.

With reference to FIG. 10, in certain embodiments, the first nozzle member 320 can comprise a distal portion 420, which can be configured to couple with the housing 210. The distal portion 420 can define an inlet 421 of the first nozzle member 320 configured to receive fuel into the first nozzle member 320. In some embodiments, an outer surface of the distal portion 420 is threaded, and is capable of engaging an inner surface of the housing 210 that at least partially defines the first egress flow path 382. The first nozzle member 320 can define a tightening interface 422 configured to be engaged by a tightening device in order to securely couple the first nozzle member 320 with the housing 210. The tightening interface 422 can comprise a substantially hexagonal flange, which can be engaged by a wrench or other suitable tightening device. In some embodiments, the first nozzle member 320 defines an outlet 423, which can be substantially opposite the distal portion 420.

Figure 11A:
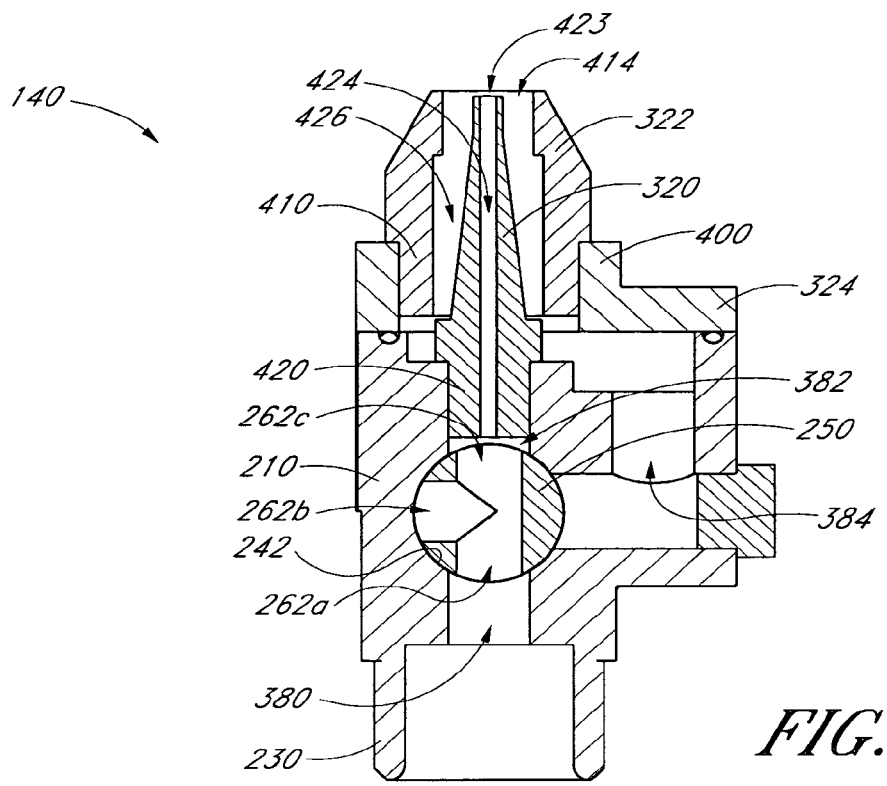
FIG. 11A is a cross-sectional view the valve assembly of FIG. 3 taken along the view line 11A-11A showing the valve assembly in a first operational configuration.

With reference to FIG. 11A, in certain embodiments, a substantial portion of the first nozzle member 320 is within the second nozzle member 322 in the assembled valve assembly 140. In some embodiments, the first nozzle member 320 and the second nozzle member 322 each comprise a common longitudinal axis. In further embodiments, the longitudinal axis defined by the first and second nozzle members 320, 233 is substantially perpendicular to a longitudinal axis defined by the inner sidewall 242 of the housing 210. In some embodiments, one or more of the first and second nozzle members 320, 322 defines a longitudinal axis that is substantially perpendicular to an axis about which the valve body 250 is configured to rotate.

The outlet 423 of the first nozzle member 320 can extend beyond, be substantially flush with, or be interior to the outlet 414 of the second nozzle member 322. Accordingly, in some embodiments, the first nozzle member 320 is configured to direct fuel through the outlet 414 of the second nozzle member 320. Various embodiments of first and second nozzle members compatible with certain embodiments of the valve assembly 140 described herein are disclosed in U.S. patent application Ser. No. 11/443,446, titled NOZZLE, filed May 30, 2006, the entire contents of which are hereby incorporated by reference herein and made a part of this specification.

In some embodiments, the distal portion 420 of the first nozzle member 320 is coupled with the housing 210 in substantially fluid-tight engagement. The first nozzle member 320 can thus define an inner flow channel 424 through which fuel can be directed and dispensed. In some embodiments, fuel is dispensed from the inner flow channel 424 via the outlet 423 at a first pressure.

In some embodiments, the rim 410 of the second nozzle member 322 is coupled with the collar 400 of the cover 324 in substantially fluid-tight engagement, and can provide an outer flow channel 426 through which fuel can be directed and dispensed. In some embodiments, at least a portion of an outer boundary of the outer flow channel 426 is defined by an inner surface of the second nozzle member 322, and at least a portion of an inner boundary of the outer flow channel 426 is defined by an outer surface of the first nozzle member 320. Thus, in some embodiments, at least a portion of the inner flow channel 424 is within the outer flow channel 426. In some embodiments, fuel is dispensed from the outer flow channel 426 via the outlet 414 at a second pressure. In some embodiments, the second pressure is less than the first pressure at which fuel is dispensed from the inner flow channel 424. In further embodiments, the inner flow 424 channel is configured to dispense liquid propane at the first pressure and the outer flow channel 426 is configured to dispense natural gas at a second pressure.

Other configurations of the nozzle members 320, 322 and/or the inner and outer flow channels 424, 426 are also possible. For example, in some embodiments the first nozzle member 320 is not located within the second nozzle member 322. The first and second nozzle members 320, 322 can be situated proximate or adjacent one another, can be oriented to dispense fuel in a substantially common direction, or can be oriented to dispense fuel in different directions, for example.

With continued reference to FIG. 11A, the illustrated embodiment of the valve assembly 140 is shown in a first operational configuration. In the first configuration, the valve body 250 is oriented in a first position such that the ports 262a, 262c provide fluid communication between the flow path 380 defined by the input 230 and the first egress flow path 382 defined by the housing 210. In some embodiments, the port 262b is directed toward the inner sidewall 242 of the housing 210, which can substantially prevent fluid flow out of the port 262b. Additionally, the valve body 250 can substantially block the second egress flow path 384, thereby substantially preventing fluid flow through the second egress flow path 384.

Accordingly, in certain embodiments, in the first operational configuration, the valve assembly 140 can accept fuel via the burner input 230, can direct the fuel along the flow path 380, through the valve body 250, through the first egress flow path 382 and through the inner flow channel 424, and can dispense the fuel at a proximal end of the inner flow channel 424 via the outlet 423.

Figure 11B:
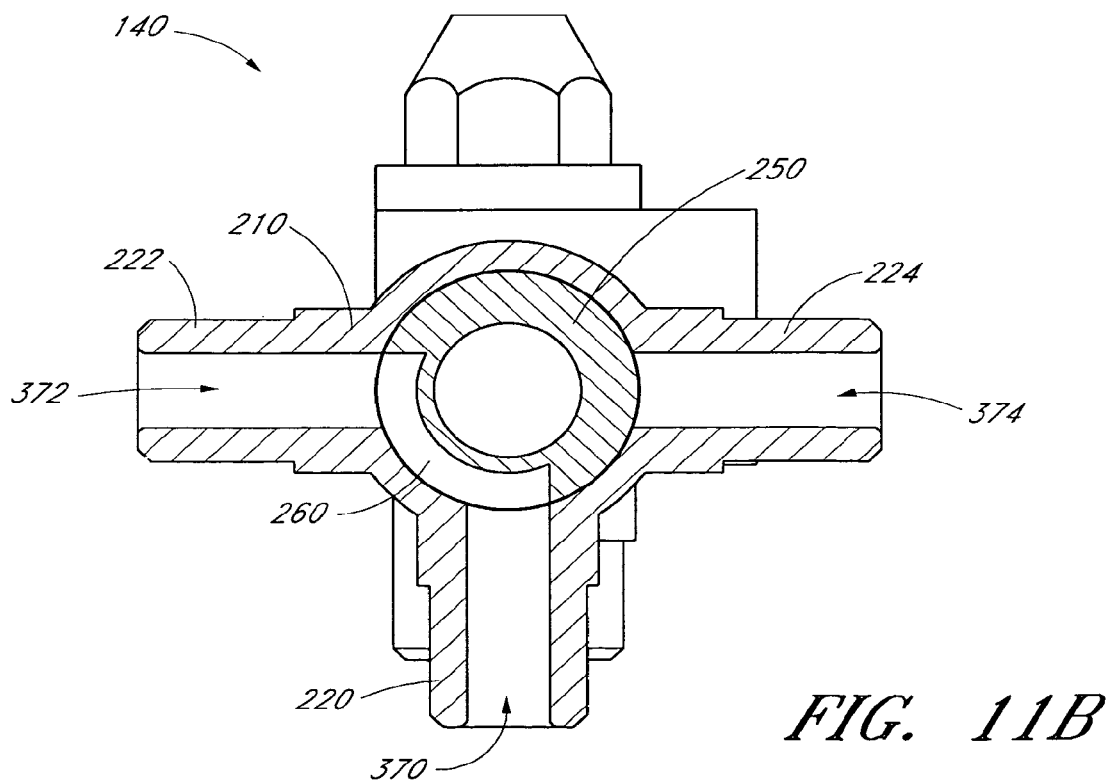
FIG. 11B is a cross-sectional view the valve assembly of FIG. 3 taken along the view line 11B-11B showing the valve assembly in the first operational configuration.

With reference to FIG. 11B, in certain embodiments, when the valve body 250 is oriented in the first position, the channel 260 can provide fluid communication between the flow path 370 and the flow path 372 defined by the housing 210. Accordingly, fuel entering the ODS input 220 can flow through the flow path 370, through the channel 260, through the flow path 372, and out of the first ODS output 222. In some embodiments, the valve body 250 can substantially block the flow path 374 such that fuel is substantially prevented from flowing through the second ODS output 224.

Figure 12A:
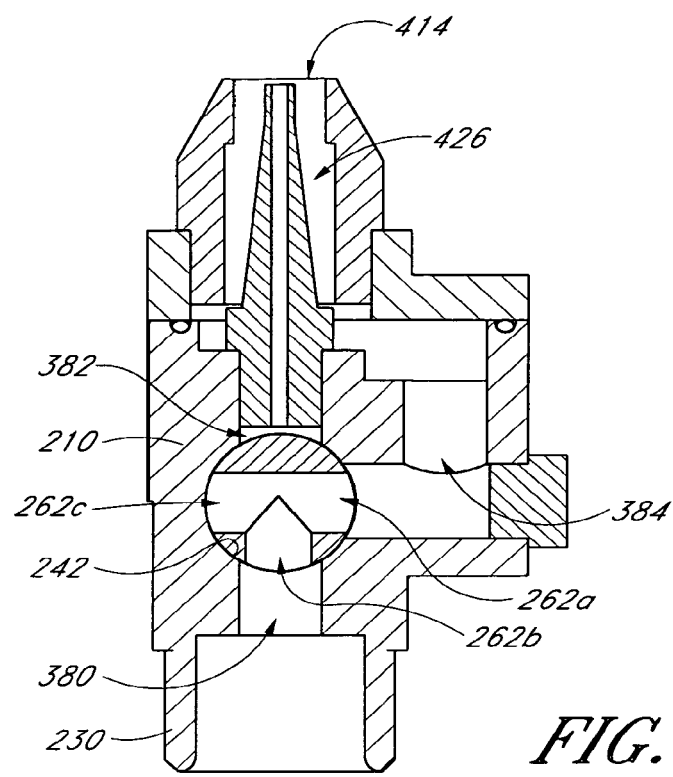
FIG. 12A is a cross-sectional view the valve assembly of FIG. 3 similar to the view depicted in FIG. 11A showing the valve assembly in a second operational configuration.

With reference to FIG. 12A, the illustrated embodiment of the valve assembly 140 is shown in a second operational configuration. In the second configuration, the valve body 250 is oriented in a second position such that the ports 262a, 262b provide fluid communication between the flow path 380 defined by the input 230 and the second egress flow path 384 defined by the housing 210. In some embodiments, the port 262c is directed toward the inner sidewall 242 of the housing 210, which can substantially prevent fluid flow out of the port 262c. Additionally, the valve body 250 can substantially block the first egress flow path 382, thereby substantially preventing fluid flow through the second egress flow path 382.

Accordingly, in certain embodiments, in the second operational configuration, the valve assembly 140 can accept fuel via the burner input 230, can direct the fuel along the flow path 380, through the valve body 250, through the second egress flow path 384 and through the outer flow channel 426, and can dispense the fuel at a proximal end of the outer flow channel 426 via the outlet 414.

Figure 12B:
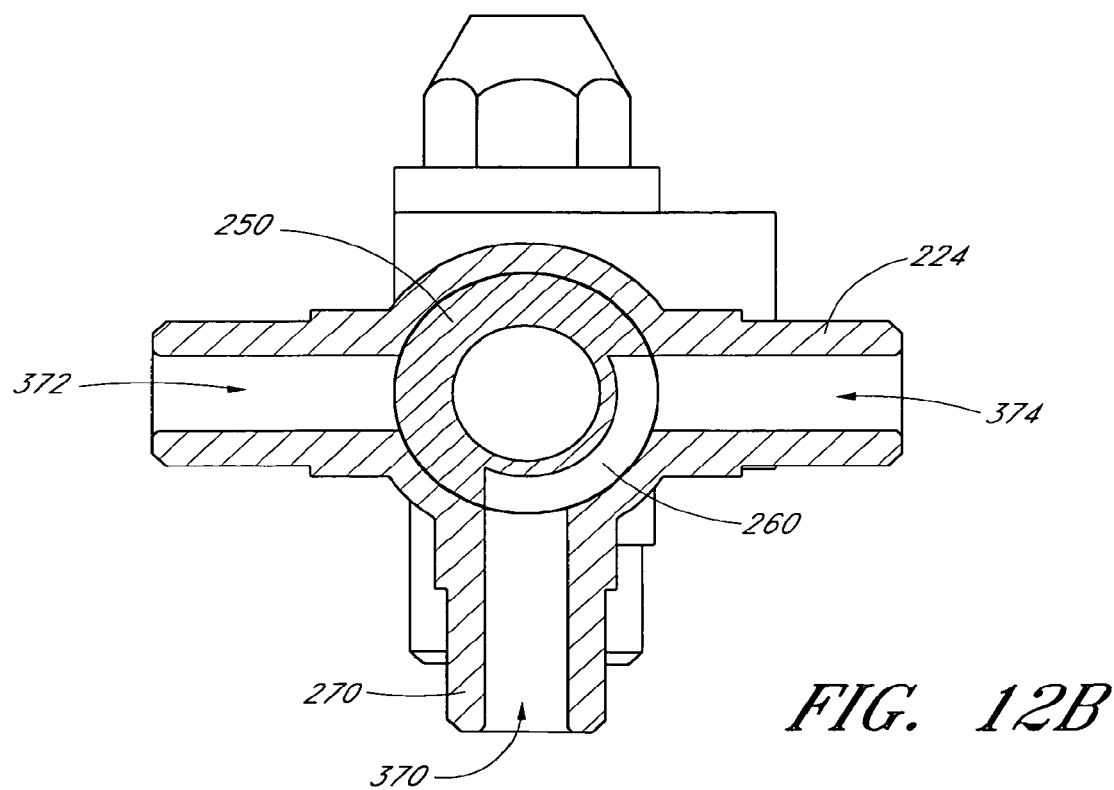
FIG. 12B is a cross-sectional view the valve assembly of FIG. 3 similar to the view depicted in FIG. 11B showing the valve assembly in the second operational configuration.

With reference to FIG. 12B, in certain embodiments, when the valve body 250 is oriented in the second position, the channel 260 can provide fluid communication between the flow path 370 and the flow path 374 defined by the housing 210. Accordingly, fuel entering the ODS input 220 can flow through the flow path 370, through the channel 260, through the flow path 374, and out of the second ODS output 224. In some embodiments, the valve body 250 can substantially block the flow path 372 such that fuel is substantially prevented from flowing through the second ODS output 224.

In certain embodiments, the valve assembly 140 is configured to accept and channel liquid propane when in the first operational configuration and to accept and channel natural gas when in the second operational configuration. In other embodiments, the valve assembly 140 is configured to channel one or more different fuels when in either the first or second operational configuration.

With reference to FIG. 13A, in certain embodiments, the valve assembly 140 is positioned to be in fluid communication with the burner delivery line 143. The valve assembly 140 can be coupled with the burner delivery line 143 in any suitable manner and/or can be positioned in relatively fixed relation with respect to the burner delivery line 143. In some embodiments, the burner delivery line defines an opening (not shown) at a first end thereof through which one or more of the nozzle elements 320, 322 can extend. In other embodiments, the nozzle elements 320, 322 are not located within the burner delivery line 143 but are positioned to direct fuel into the burner delivery line 143. The burner delivery line 143 can define an opening 440 at a second end thereof through which fuel can flow to the burner 135.

In some embodiments, the burner delivery line 143 defines an air intake, aperture, opening, or window 445 through which air can flow to mix with fuel dispensed by the valve assembly 140. In some embodiments, the window 445 is adjustably sized. For example, in some embodiments, the burner delivery line 143 defines a mixing section, passageway, chamber, corridor, or compartment 446, which can include a primary conduit 447 and a sleeve 449. As used herein, the term "compartment" is a broad term used in its ordinary sense and can include, without limitation, structures that define a volume of space through which fluid can flow.

Each of the primary conduit 447 and the sleeve 449 can define an opening. In some embodiments, the openings can be relatively aligned with each other such that the window 445 is relatively large, and the sleeve 449 can be rotated such that less of the openings are aligned, thereby making the window 445 relatively smaller. In some embodiments, a wrench or other suitable device is used to adjust the size of the window 445. In other embodiments, the size of the window 445 can be adjusted by hand.

With continued reference to FIG. 13A, in some embodiments, the window 445 is relatively large, thus allowing a relatively large amount of air to be drawn into the burner delivery line 143 as fuel is dispensed from the valve assembly 140. In some embodiments, the valve assembly 140 is configured to operate in the first configuration such that fuel is dispensed via the outlet 423 defined by the first nozzle member 320 when the window 445 is relatively large.

With reference to FIG. 13B, in some embodiments, the window 445 is relatively small, thus allowing a relatively small amount of air to be drawn into the burner delivery line 143 as fuel is dispensed from the valve assembly 140. In some embodiments, the valve assembly 140 is configured to operate in the second configuration such that fuel is dispensed via the outlet 414 defined by the second nozzle member 322 when the window 445 is relatively small.

In certain embodiments, the valve assembly 140 and the window 445 are configured to create an air-fuel mixture that produces a blue flame at the burner 135. In further embodiments one or more of the valve assembly 140 and the window 445 can be adjusted to alter the air-fuel mixture, and as a result, certain properties of the flame produced at the burner. Such properties can include, for example, the color, shape, height, and/or burn quality (e.g., number and/or type of by-products) of the flame.

Figure 14:
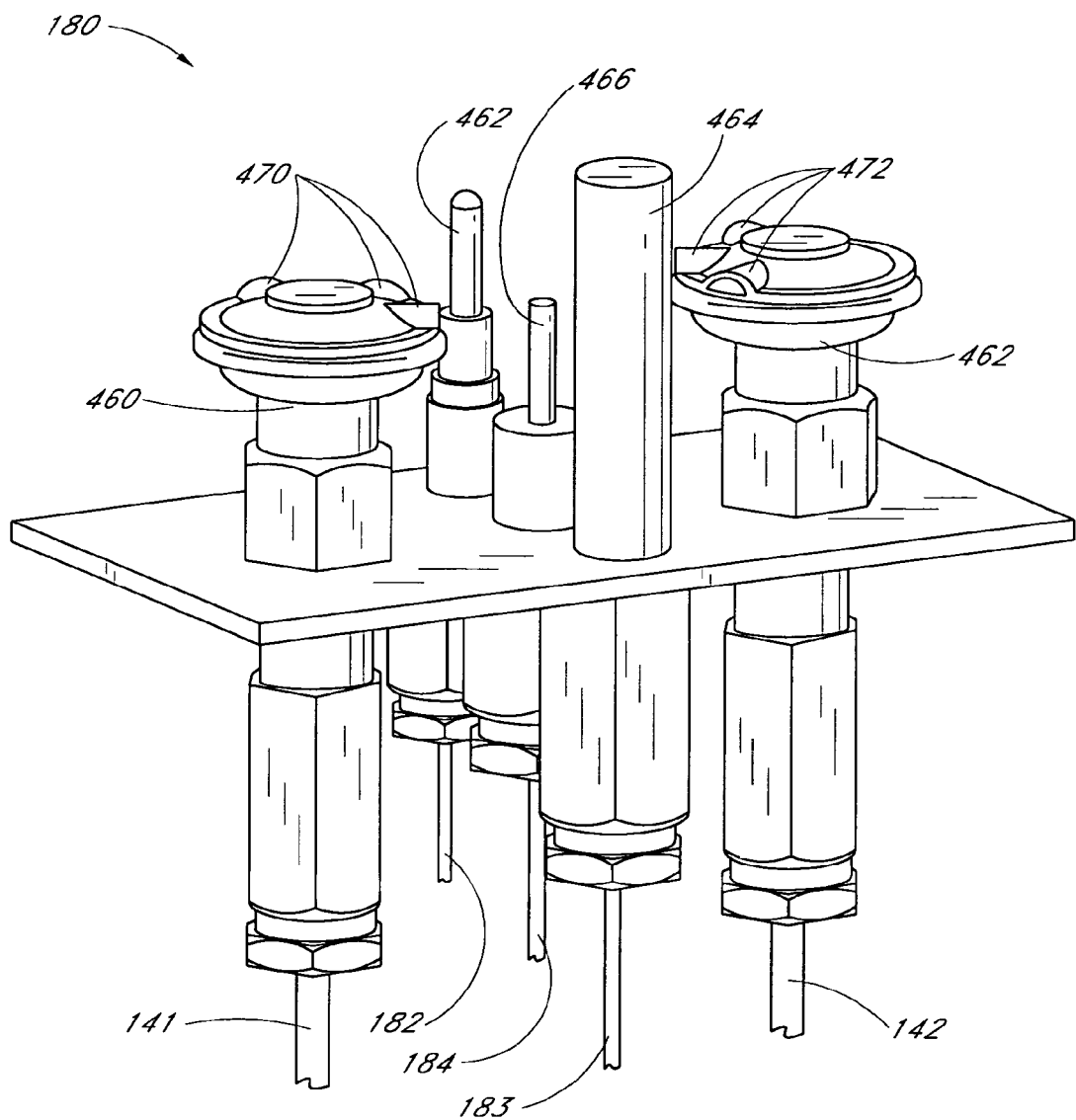
FIG. 14 is a perspective view of an embodiment of an oxygen depletion sensor compatible with the fuel delivery system of FIG. 2.

With reference to FIG. 14, in certain embodiments, the ODS 180 includes nozzle body or first fuel dispenser 460 coupled with the first ODS delivery line 141 and a second fuel dispenser 462 coupled with the second ODS delivery line 142. The ODS 180 can include a thermocouple 462 coupled with the feedback line 182, a thermopile 464 coupled with the power line 183, and an igniter 466 coupled with the igniter line 184.

In some embodiments, the first dispenser 460 includes a plurality of nozzles 470 configured to direct a flame toward the thermocouple 462, the thermopile 464, and/or the burner 135 when the valve assembly 140 is in the first state. The second dispenser 462 can include a plurality of nozzles 472 configured to direct a flame toward the thermocouple 462, the thermopile 464, and/or the burner 135 when the valve assembly 140 is in the second state.

In some embodiments, heating the thermocouple 462 provides current to a solenoid within the control valve 130, which maintains a shutoff valve in an open configuration and thus permits delivery of fuel to the burner 135. Heating the thermopile 464 can provide electrical power to the control valve 130 and/or an electrical component coupled with the control valve 130, such as a thermostat. Other oxygen depletion sensors compatible with certain embodiments described herein are disclosed in U.S. patent application Ser. No. 11/443,492, titled OXYGEN DEPLETION SENSOR, filed May 30, 2006, the entire contents of which are hereby incorporated by reference herein and made a part of this specification.

Figure 15:
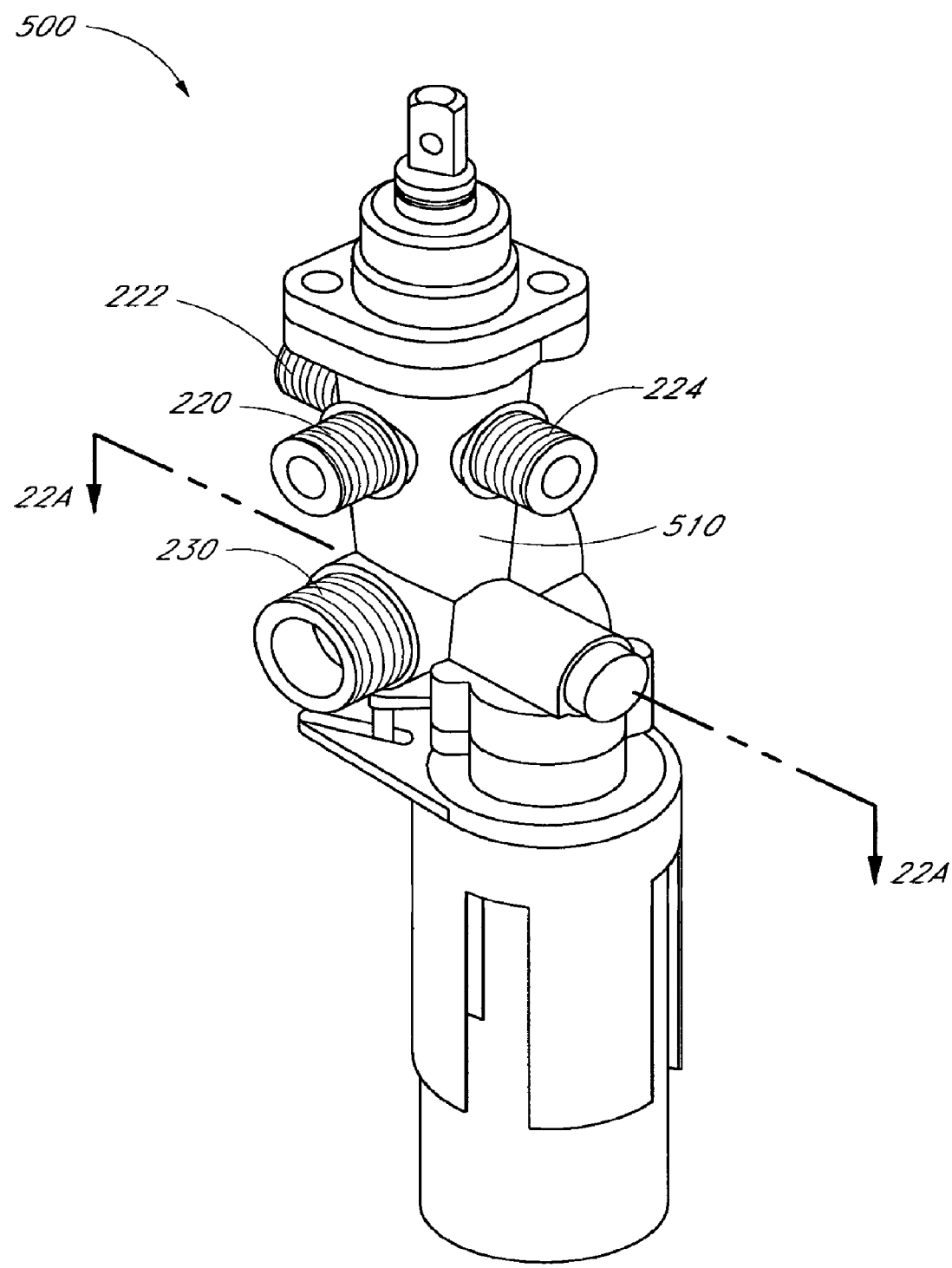
FIG. 15 is a perspective view of another embodiment of a valve assembly compatible with, for example, certain embodiments of the heater 10.

FIG. 15 illustrates an embodiment of a valve assembly 500, which can resemble the valve assembly 140 in many respects. Accordingly, like features are identified with like reference numerals. The valve assembly 500 can also include features different from those discussed with respect to the valve assembly 140, such as those described hereafter. In various embodiments, the valve assembly 500 is configured for use with the heater 10, and can be configured for use with other suitable heating devices. In certain preferred embodiments, the valve assembly 500 is configured for use with gas log inserts, gas fireplaces, or other heating devices for which the color of the flame produced by the devices may desirably be a preferred color, such as, for example, yellow.

In certain embodiments, the valve assembly 500 includes a housing 510. The housing 510 can comprise a unitary piece of material, or can comprise multiple pieces joined in any suitable manner. In certain embodiments, the housing 510 defines an ODS input 220 configured to couple with the ODS transport line 138 and to receive fuel therefrom. The housing 510 can define a first ODS output 222 configured to couple with first ODS delivery line 141 and to deliver fuel thereto, and can define a second ODS output 224 configured to couple with the second ODS delivery line 142 and to deliver fuel thereto. In some embodiments, the housing 510 defines a burner input 230 configured to couple with the burner transport line 137 and to receive fuel therefrom.

Figure 16:
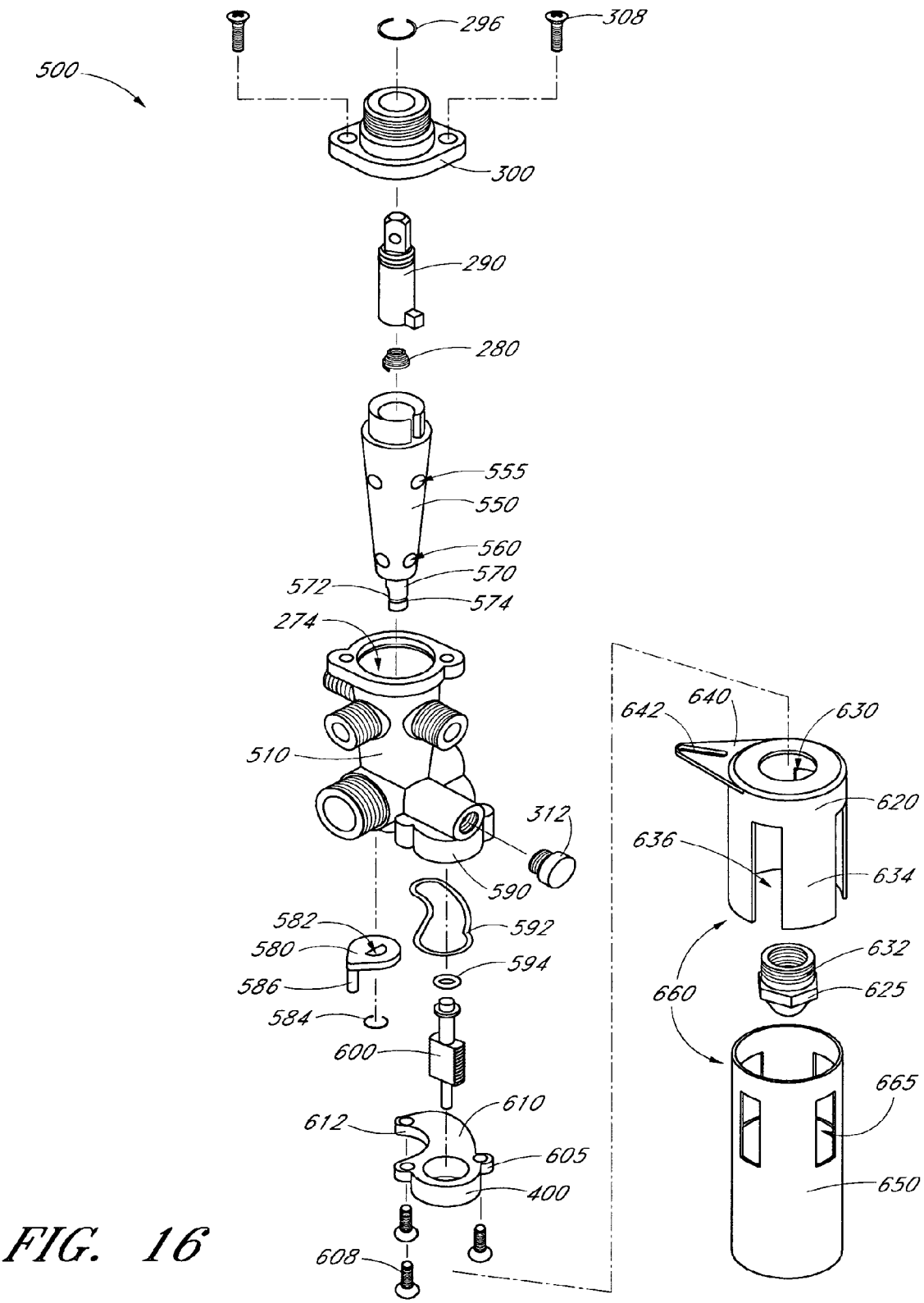
FIG. 16 is an exploded perspective view of the valve assembly of FIG. 15.

With reference to FIG. 16, in certain embodiments, the housing 510 defines a cavity 274 configured to receive a valve body 550. The housing 510 and/or the valve body 550 can be coupled with a biasing member 280, a shaft 290, and a cap 300 via one or more fasteners 308 and a split washer 296, as described above. In some embodiments, the housing 510 is coupled with a plug 312.

The valve body 550 can resemble the valve body 250 in certain respects and/or can include different features. In some embodiments, the valve body 550 defines an upper set of apertures 555 and a lower set of apertures 560, which are described more fully below. In some embodiments, the valve body 550 defines a protrusion 570 that can extend from a lower end of the valve body 550. The protrusion 570 can define a substantially flat face 572 and a channel 574. In certain embodiments, the protrusion 570 extends through a lower end of the housing 510 in the assembled valve assembly 500.

In some embodiments, the valve assembly 500 includes a cam 580 configured to couple with the protrusion 570 of the valve body 550. The cam 580 can define an aperture 582 through which a portion of the protrusion 570 can extend. In some embodiments, the aperture 582 is sized such that the protrusion 570 fits snugly therein. In some embodiments, the aperture 582 is shaped substantially as a semicircle, and can comprise a flat face which, in further embodiments, extends through an axial or rotational center of the cam 580. The flat face of the aperture 582 can abut the flat face 572 of the protrusion 570, and can cause the cam 580 to rotate about the axial center when the valve body 550 is rotated within the housing 510. In certain embodiments, the cam 580 is retained on the protrusion 570 via a split washer 584. In some embodiments, a rod 586 extends from a lower surface of the cam 580. The rod 586 can be substantially cylindrical, thus comprising a substantially smooth and rotationally symmetric outer surface.

In some embodiments, the housing 510 defines a projection 590 at a lower end thereof. The projection 590 can be configured to couple with a gasket 592, an O-ring or sealing member 594, a first nozzle member 600 and a cover 605, as further described below. In some embodiments, the cover 605 is coupled with the projection 590 via fasteners 608.

As with the cover 324, the cover 605 can define a substantially flat surface 610 configured to abut a flat surface defined by the projection 590, and in some embodiments, the cover 605 defines a collar 400. The cover 605 can also define a rounded side surface 612. A radius of the side surface 612 can be slightly larger than the radius of a rounded portion of the cam 580, and can thus permit the rounded portion of the cam 580 to rotate proximate the cover 605 in the assembled valve assembly 500.

In certain embodiments, the cover 324 is configured to be coupled with a shroud, sleeve, occlusion member, or cover 620 and a second nozzle member 625. In some embodiments, the cover 620 is substantially cylindrical. An upper surface of the cover 620 can be substantially flat, and can define an opening 630. The opening 630 can be sized to receive a rim 632 of the second nozzle member 625. The opening 630 can be substantially circular, and can define a diameter slightly larger than an outer diameter of the rim 632 of the second nozzle member 625. Accordingly, in some embodiments, the cover 620 can rotate about the rim 632 of the second nozzle member 625 with relative ease in the assembled valve assembly 500.

The cover 620 can define one or more screens 634 separated by one or more gaps 636. In some embodiments, each screen 634 extends about a greater portion of a circumference of the cover 620 than does one or more neighboring gaps. In some embodiments, each screen 634 is substantially the same size and shape, and is spaced adjacent screens 634 by an equal amount. Other arrangements are also possible.

The cover 620 can define an extension 640 that projects from a top end of the cover 620. In some embodiments, the extension 640 is substantially coplanar with a top surface of the cover 620, and in other embodiments, a plane defined by the extension 640 is substantially parallel to the plane of the top surface. In some embodiments, the extension 640 defines a slot 642 configured to receive the rod 586 of the cam 580. As further discussed below, the cam 580 can cooperate with the extension 640 to rotate the cover 620 as the valve body 550 is rotated.

In some embodiments, the cover 620 is configured to receive a fuel directing member, tube, pipe, or conduit 650, which in some embodiments, comprises or is coupled with the burner delivery line 143. In other embodiments, the cover 620 is received within the conduit 650. In some embodiments, the cover 620 and conduit 650 cooperate to form a mixing section, passageway, chamber, corridor, or compartment 660. As further described below, the mixing compartment 660 can define one or more adjustably sized air intakes, channels, openings, apertures, or windows 665 through which air can flow to mix with fuel delivered to the conduit 650 via the valve assembly 500. For example, a flow area of the windows 665 can vary between a first operational configuration and a second operational configuration of the valve assembly 500.

With reference to FIGS. 17A-17D, in certain embodiments, the valve member 550 defines a series of upper apertures 555a, b and a series of lower apertures 560a, b, c. Each of the apertures 555a, b and 560a, b, c can be in fluid communication with a cavity 670 defined by the valve body 550. In some embodiments, the valve body 550 includes a cap 675 configured to seal the cavity 670. Accordingly, in some embodiments, fuel can enter the cavity 670 via one or more of the apertures 555a, b and 560a, b, c, can substantially fill the cavity 670, and can exit the cavity 670 via one or more of the apertures 555a, b and 560a, b, c, depending on the orientation of the valve body 550. In other configurations, a separator, such as a plate or an insert, is positioned between the upper and lower apertures 555a, b, 560a, b, c, substantially preventing fluid communication between the upper and lower apertures. Such configurations can be desirable for applications in which fuel entering the upper apertures 55a, b is preferably maintained separate from fuel entering the lower apertures 560a,b,c. Any suitable combination of the features of the valve member 250 and the valve member 550 is possible.

Figure 18:
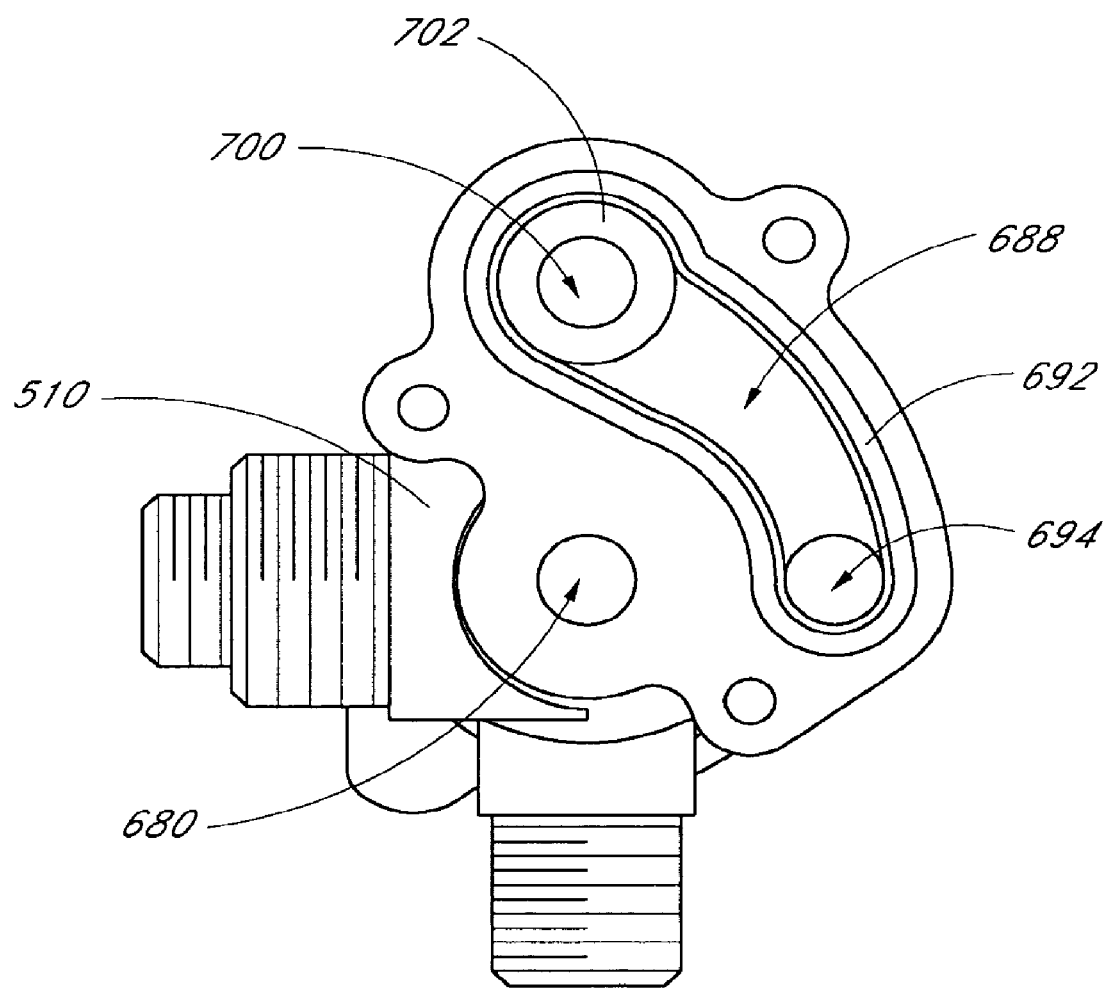
FIG. 18 is a bottom plan view of the valve assembly of FIG. 15.

With reference to FIG. 18, in certain embodiments, the housing 510 defines an opening 680 through which the protrusion 570 of the valve body 550 can extend. The housing can define a recess 688, such as the recess 388. The recess 688 can cooperate with the cover 605 to define a passage through which fuel can flow. In some embodiments, the housing 510 defines a channel 692, such as the channel 392, which can be configured to receive the gasket 592 in order to create a substantially fluid-tight seal between the housing 510 and the cover 605. In some embodiments, fuel can flow from a first egress aperture 694 defined by the housing 510 and into the passage defined by the recess 688 and the cover 605 when the valve assembly 500 is in a first operational configuration, as further described below.

In some embodiments, the housing 510 defines a second egress aperture 700. As further described below, in some embodiments, fuel can flow from the second egress aperture 700 into the first nozzle member 600 when the valve assembly 500 is in a second operational configuration. In some embodiments, the housing 510 defines a recess about the second egress aperture 700 which can be sized and shaped to receive the sealing member 594, and can be configured to form a substantially fluid-tight seal therewith.

Figure 19:
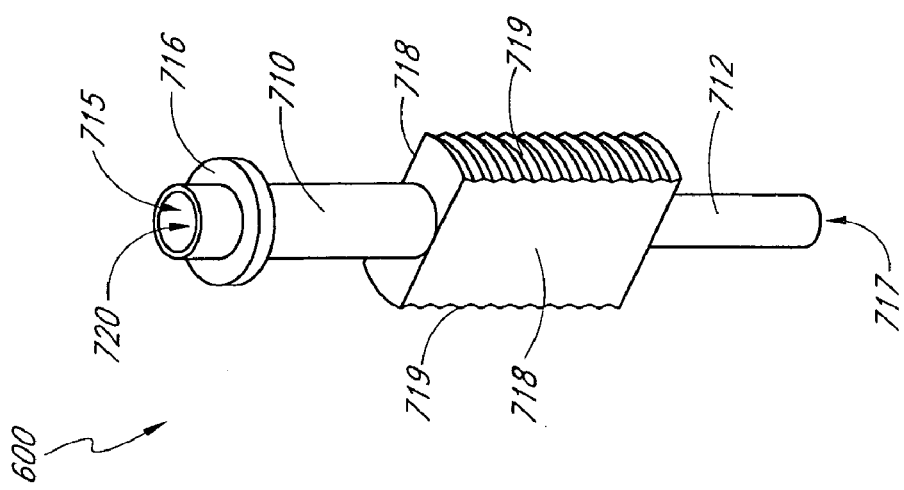
FIG. 19 is a perspective view of an embodiment of a nozzle member compatible with the valve assembly of FIG. 15.

With reference to FIG. 19, in certain embodiments, the first nozzle member 600 includes an upper stem 710, a lower stem 712, and a body 714. In some embodiments, the upper stem 710 is substantially cylindrical. The upper stem can define an input 715 configured to receive fuel into the first nozzle member 600, and can include shelf 716 configured to contact the sealing member 594 in the assembled valve assembly 500. The lower stem 712 can also be substantially cylindrical, and can define an outer diameter smaller than an outer diameter of the upper stem 710. The lower stem 712 can define an output 717 configured to dispense fuel. In some embodiments, an inner diameter defined by the lower stem 712 is smaller than an inner diameter defined by the upper stem 710.

In some embodiments, the body 714 includes two substantially flat faces 718, which can be oriented substantially parallel to each other. The faces 718 can extend outward from the upper and lower stems 710, 712, and can thus define wings. In some embodiments, the nozzle member 600 includes one or more connection interfaces 719 configured to engage the second nozzle member 600. In some embodiments, the connection interfaces 719 comprise curved, threaded surfaces that extend from one face 718 to another.

The first nozzle member 600 can define an inner flow path 720 that extends through the upper and lower stems 710, 712 and the body 714. In some embodiments, fuel can flow through the inner flow path 720 when the valve assembly 500 is in the second operational configuration.

Figure 20:
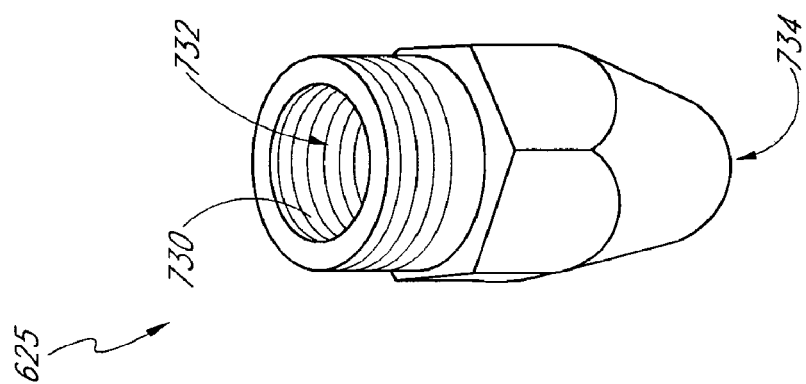
FIG. 20 is a perspective view of an embodiment of a nozzle member compatible with the valve assembly of FIG. 15.

With reference to FIG. 20, in certain embodiments, an inner surface 730 of the second nozzle member 625 is threaded or includes any other suitable connection interface for coupling with the connection interface or interfaces 719 of the first nozzle member 600. In some embodiments, the threading extends through a substantial portion of the nozzle member 625, and extends downward to an inwardly projecting ridge or shelf that can serve as a stop against which a lower edge of the body 714 of the first nozzle member 600 can abut. The second nozzle member 625 can define an input 732 configured to receive fuel, and an output 734 configured to dispense fuel.

Figure 21:
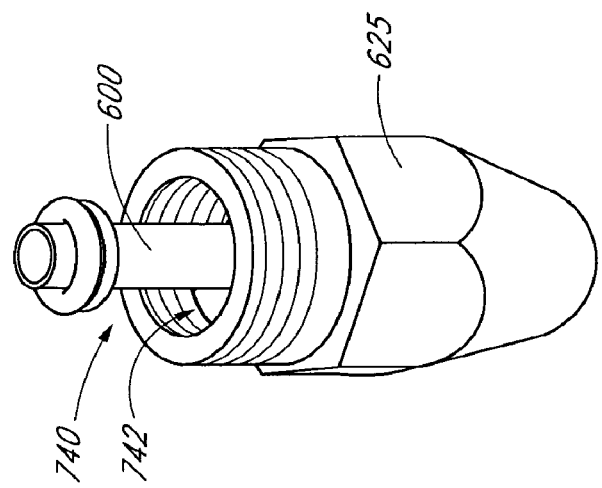
FIG. 21 is a perspective view of the nozzle members of FIGS. 19 and 20 in a coupled configuration.

With reference to FIG. 21, in certain embodiments, the first and second nozzle members 600, 625 define a gap 740 through which fuel can flow. In some embodiments, fuel can flow through the gap 740 and through an outer flow path 742, which can be defined by an outer surface of the first nozzle member 600 and an inner surface of the second nozzle member 625. In some embodiments, fuel flows through the gap 740 and the outer flow path 742 when the valve assembly 500 is in the first operational configuration.

Figure 22A:
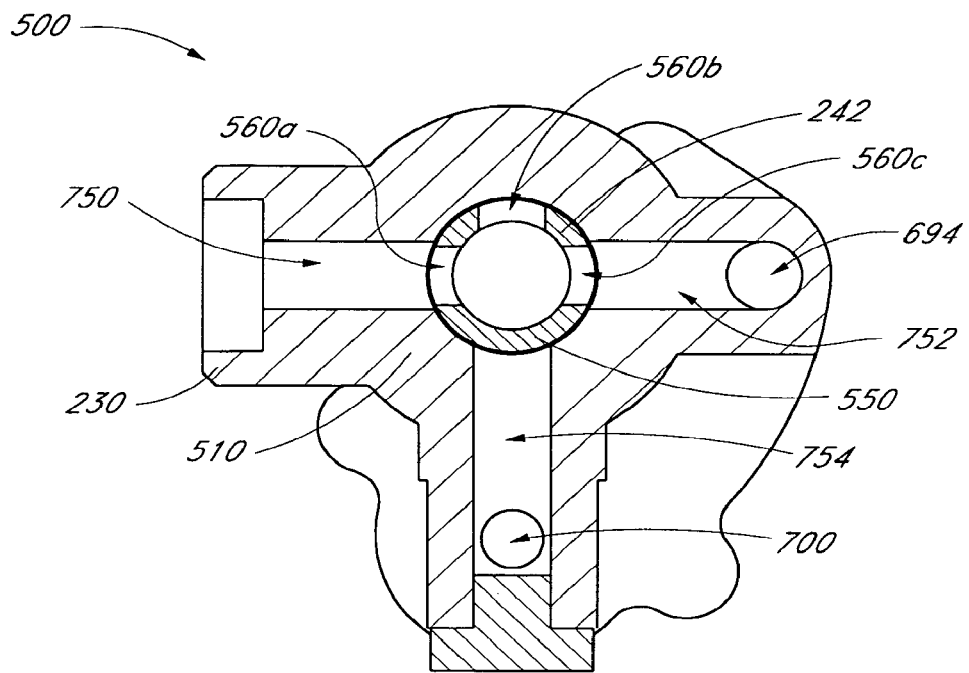
FIG. 22A is a cross-sectional view of the valve assembly of FIG. 15 taken along the view line 22A-22A showing the valve assembly in a first operational configuration.

FIG. 22A illustrates an embodiment of the valve assembly 500 comprising a housing 510 that defines an input flow path 750, a first egress flow path 752, and a second egress flow path 754. In the illustrated embodiment, the valve assembly is in the first operational configuration. In the first configuration, the valve body 550 is oriented in a first position such that the ports 560a, 560c provide fluid communication between the input flow path 750 and the first egress flow path 752. In some embodiments, the port 560b is directed toward the inner sidewall 242 of the housing 510, which can substantially prevent fluid flow out of the port 262b. Additionally, the valve body 550 can substantially block the second egress flow path 754, thereby substantially preventing fluid flow through the second egress flow path 754.

Accordingly, in certain embodiments, in the first operational configuration, the valve assembly 500 can accept fuel via the burner input 230, can direct the fuel along the input flow path 750, through the valve body 550, through the first egress flow path 752 and out the first egress aperture 694. As described above, fuel flowing through the first egress aperture 694 can progress through the passage defined by the recess 688 and the cover 605. The fuel can flow through the gap 740 and the outer flow path 742 defined by the first and second nozzle members 600, 625, and can be dispensed via the output 734 of the second nozzle member 625.

In certain embodiments, when the valve assembly 500 is in the first operational configuration, the valve body 550 is oriented such that the port 555a (see FIG. 17C) is in fluid communication with the ODS input 220 and the port 555b (see FIG. 17C) is in fluid communication with the first ODS output 222. The valve body 550 can thus function similarly to the valve body 250, and can direct fuel from the ODS input 220 to the first ODS output 222.

Figure 22B:
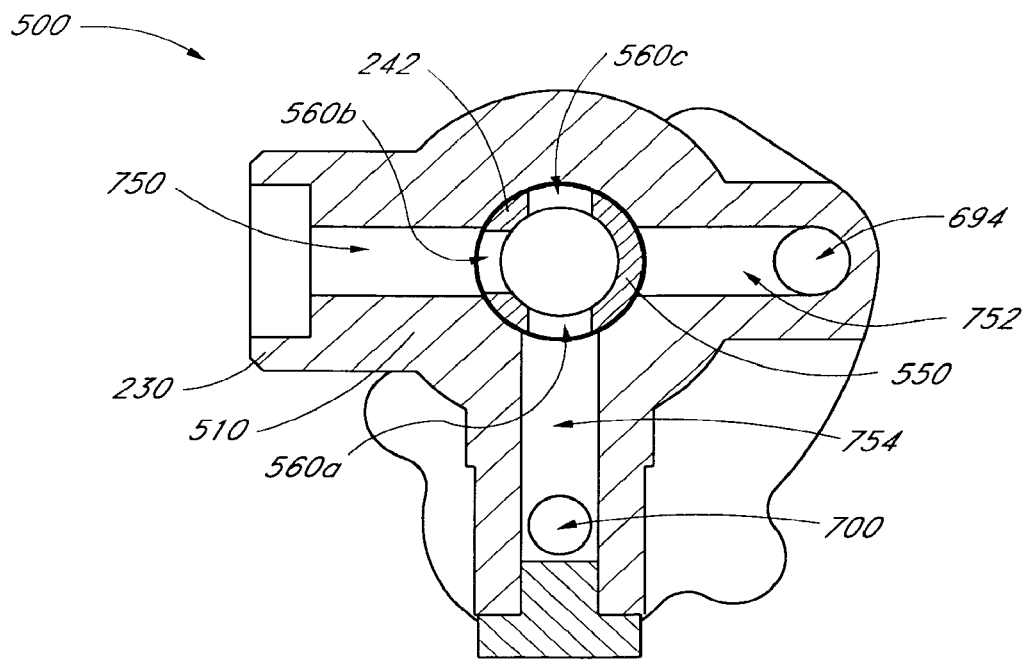
FIG. 22B is a cross-sectional view of the valve assembly of Figure similar to the view depicted in FIG. 22A showing the valve assembly in a second operational configuration.

FIG. 22B illustrates an embodiment of the valve assembly 500 in the second operational configuration. In the second configuration, the valve body 550 is oriented in a second position such that the ports 560a, 560b provide fluid communication between the input flow path 750 and the second egress flow path 754. In some embodiments, the port 560c is directed toward the inner sidewall 242 of the housing 510, which can substantially prevent fluid flow out of the port 560c. Additionally, the valve body 550 can substantially block the first egress flow path 752, thereby substantially preventing fluid flow through the first egress flow path 752.

Accordingly, in certain embodiments, in the second operational configuration, the valve assembly 500 can accept fuel via the burner input 230, can direct the fuel along the input flow path 750, through the valve body 550, through the second egress flow path 754 and out the second egress aperture 700. Fuel flowing through the second egress aperture 700 can progress through the first nozzle member 600 and can be dispensed by the output 717.

In certain embodiments, when the valve assembly 500 is in the second operational configuration, the valve body 550 is oriented such that the port 555*b* (see FIG. 17C) is in fluid communication with the ODS input 220 and the port 555*a* (see FIG. 17C) is in fluid communication with the second ODS output 224. The valve body 550 can thus function similarly to the valve body 250, and can direct fuel from the ODS input 220 to the second ODS output 224.

With reference to FIG. 23A, in certain embodiments, the first and second nozzle members are 600, 625 are positioned to deliver fuel to the mixing compartment 660. In the illustrated embodiment, the valve assembly 500 is in the first configuration such that fuel can be dispensed via the second nozzle member 625. The flow channels or windows 665 are relatively small and allow a relatively small amount and/or a relatively low flow rate of air therethrough. In some embodiments, as fuel is dispensed from the second nozzle member 625, air is drawn through the windows 665. In some embodiments, the size of the windows 665 is such that the amount of air drawn into the mixing compartment 660 is adequate to form an air-fuel mixture that combusts as a substantially yellow flame (e.g., a flame of which a substantial portion is yellow) at the burner 135. In some embodiments, the valve assembly 500 is configured to dispense natural gas at a first pressure so as to produce a substantially yellow flame at the burner 135.

With reference to FIG. 23B, the valve assembly 500 can be configured to transition to the second operational configuration. In certain embodiments, the shaft 290 is rotated, thereby rotating the valve body 550, which rotates the cam 580. In some embodiments, rotation of the cam 580 translates the rod 586 within the slot 642 defined by the extension 640, thereby imparting rotational movement to the cover 620. Movement of the cover 620 can rotate the screens 634 relative to openings in the conduit 650, thereby adjusting the size of the windows 665. For example, prior to rotation of the screens 634, the windows 665 can define a first flow area, and subsequent to rotation of the screens 634, the windows 665 can define a second flow area which varies from the first flow area.

In some embodiments, when the valve assembly 500 is in the second operating configuration, the windows 665 are relatively larger than they are when the valve assembly 500 is in the first configuration. In some embodiments, the size of the windows 665 changes by a predetermined amount between the first and second configurations.

In some embodiments, the size of the windows 665 is such that, when the valve assembly 500 is in the second configuration, the amount of air drawn into the mixing compartment 660 is adequate to form an air-fuel mixture that combusts as a substantially yellow flame at the burner 135. In some embodiments, the valve assembly 500 is configured to dispense liquid propane at a second pressure so as to produce a substantially yellow flame at the burner 135. In some embodiments, the second pressure at which liquid propane is dispensed is larger than the first pressure at which natural gas is dispensed when the valve assembly is in the first configuration.

The valve assembly 500 can transition from the second operational configuration to the first operational configuration. In certain embodiments, the screens 634 occlude a larger portion of the openings defined by the conduit 650 when the valve assembly 500 transitions from the second operational configuration to the first operational configuration, thus reducing the size of the windows 665. Advantageously, the valve assembly 500 can transition between the first and second operating configurations as desired with relative ease. Accordingly, a user can select whichever configuration is appropriate for the fuel source with which the valve assembly 500, and more generally, the heater 10, is to be used.

Figure 24:
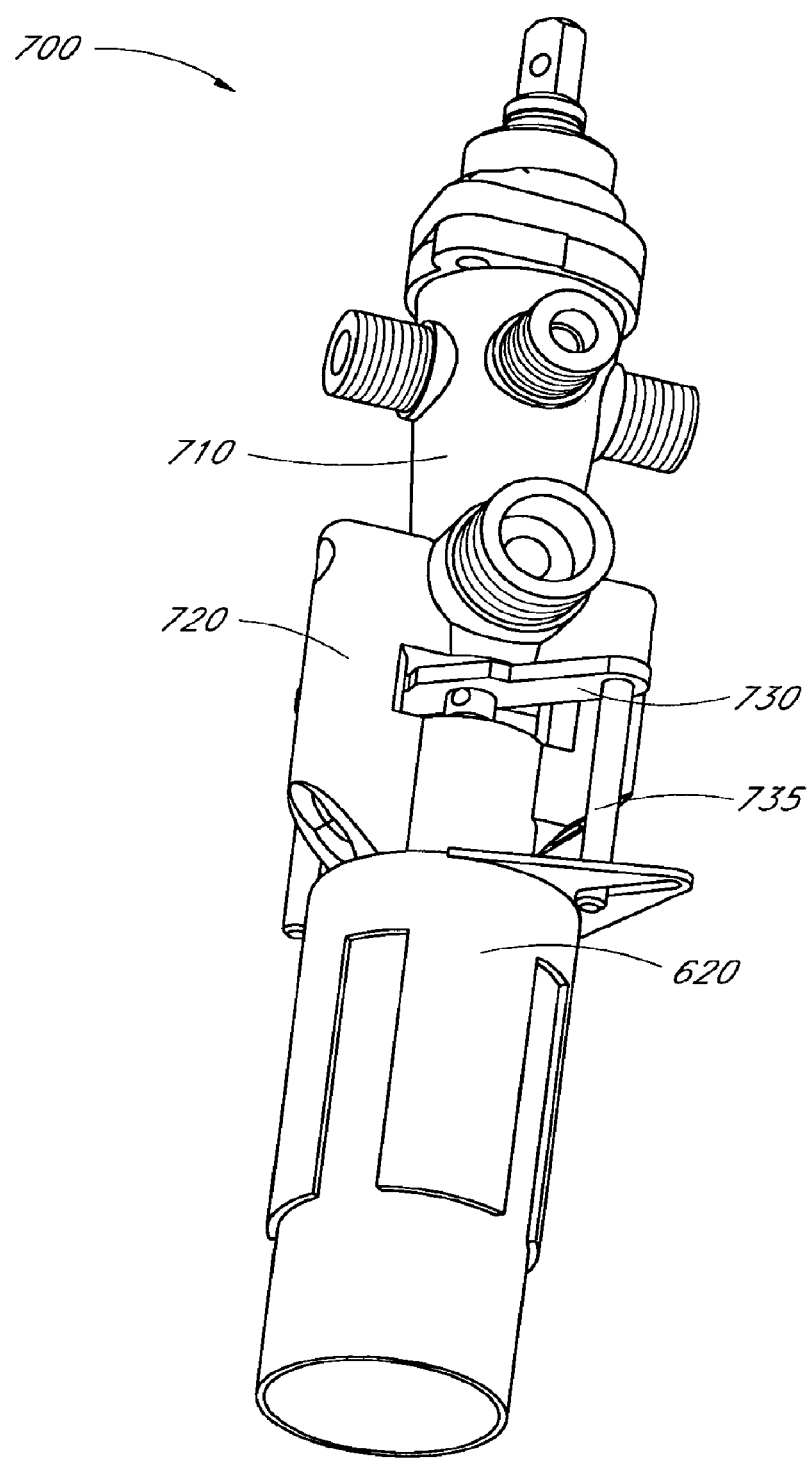
FIG. 24 is a perspective view of another embodiment of a valve assembly compatible with, for example, certain embodiments of the heater 10.

FIG. 24 illustrates another embodiment of a valve assembly 700 similar to the valve assembly 500. The valve assembly 700 can include a housing 710 that defines a channel housing 720. The valve assembly 700 can include a cam 730 from which a rod 735 extends to interact with the cover 620.

Figure 25:
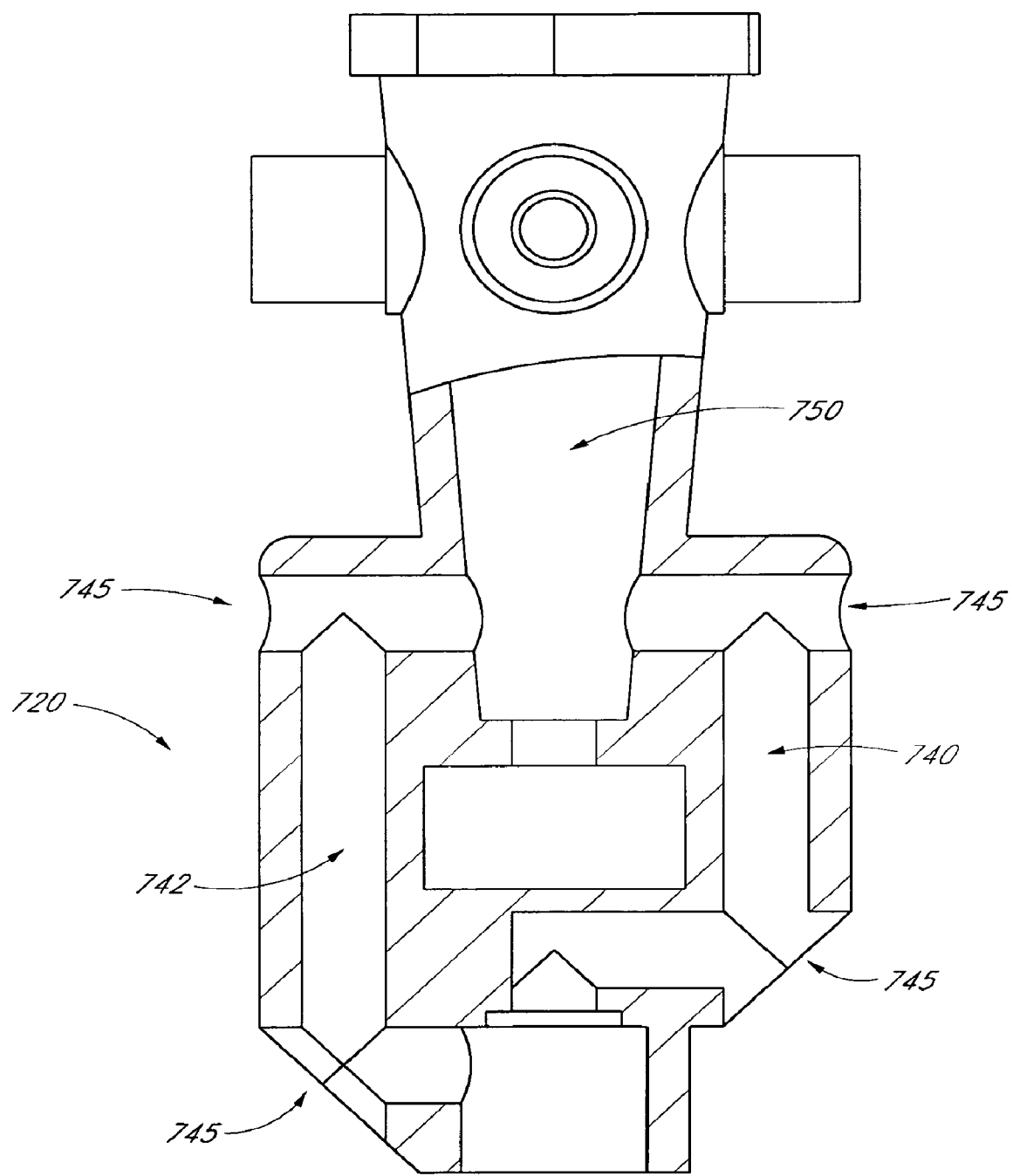
FIG. 25 is a partial cross-sectional view of a housing compatible with the valve assembly of FIG. 24.

With reference to FIG. 25, in certain embodiments, the channel housing 720, can define a first channel 740 configured to direct fuel to the first nozzle member 600, and can define a second channel 742 configured to direct fuel to the second nozzle member 625. In some embodiments, the first and second channels 740, 742 are formed via multiple drillings, and access holes 745 formed during the drillings are subsequently plugged. In some embodiments, the first and second channels 740, 742 extend from substantially opposite sides of a chamber 750.

Figure 26A:
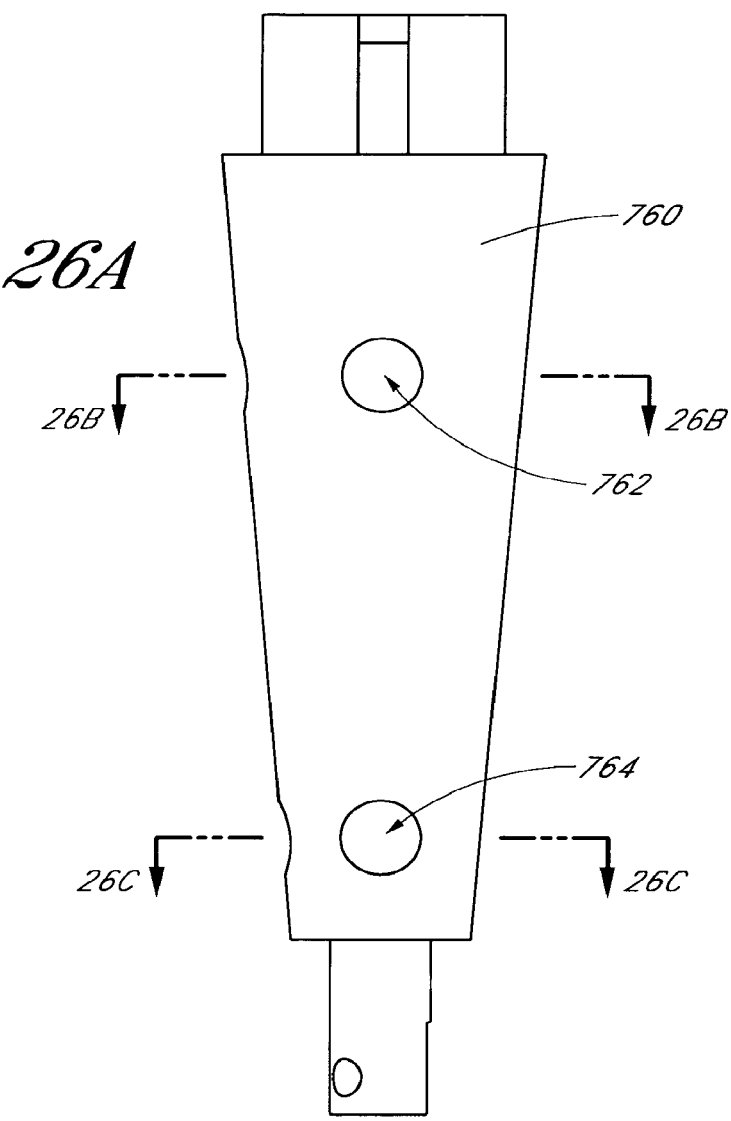
FIG. 26A is a front plan view of an embodiment of a valve body compatible with the valve assembly of FIG. 24.
Figure 26B:
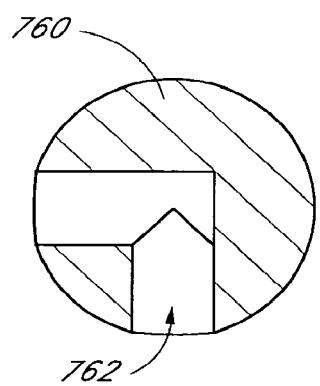
FIG. 26B is a cross-sectional view of the valve body of FIG. 26A taken along the view line 26B-26B.
Figure 26C:
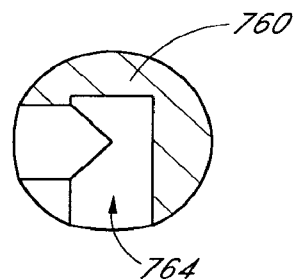
FIG. 26C is a cross-sectional view of the valve body of FIG. 26A taken along the view line 26C-26C.

With reference to FIG. 26, in some embodiments, a valve member or valve body 760 compatible with embodiments of the valve assembly 700 defines an upper flow channel 762 and a lower flow channel 764 that are similarly shaped, and can be formed by drilling into a body of the valve body 760. Each flow channel 762, 764 can redirect fluid flow at an angle of about 90 degrees. Other angles are possible. In some embodiments, respective ingress ports and egress ports of the flow channels 762, 764 are substantially coplanar along a plane running through a longitudinal axis of the valve body 760. The ingress and/or egress ports can also be offset from each other.

Any suitable combination of the features discussed with respect to any of the valve assemblies 140, 500, 700 can be incorporated into any of the other valve assemblies 140, 500, 700. For example, in some embodiments, a portion of the protrusion 570 may be removed from the valve body 550 and used in place of the valve body 250 in the valve assembly 140. Additionally, in some embodiments, the first and second nozzle members 600, 625 can replace the first and second nozzle members 320, 322 in the valve assembly 140.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An apparatus comprising:
   a dual fuel pilot assembly, said pilot assembly comprising:
   a first fuel dispenser configured to deliver a first fuel;

a second fuel dispenser configured to deliver a second fuel different from the first fuel; and at least one of a thermocouple configured to couple with a feedback line and a thermopile configured to couple with a power line;

wherein heat from combustion of either the first fuel or the second fuel is directed toward the at least one of the thermocouple and the thermopile; and a valve assembly comprising:

a housing having a first flow path and a second flow path therethrough;

a valve core positioned within the housing and having a first position and a second position; and an integral nozzle assembly having a first nozzle outlet and a second nozzle outlet;

wherein the first position of the valve core allows flow through the valve assembly along the first flow path and through the first nozzle outlet, the second position of the valve core allows flow through the valve assembly along the second flow path and through the second nozzle outlet.

2. The apparatus of claim 1, wherein the first dispenser comprises two ports and the second dispenser comprises two ports.

3. The apparatus of claim 2, wherein one port from each of the first and second dispensers is directed toward a burner, and the second port from each of the first and second dispensers is directed toward either the thermocouple or the thermopile.

4. The apparatus of claim 3, wherein the pilot assembly comprises both the thermocouple, and the thermopile and further comprising a third port on each of the first and second dispensers, wherein the second ports are directed toward the thermocouple and the third ports are directed toward the thermopile.

5. The apparatus of claim 4, wherein each of the first and second dispensers is configured to direct separate flames toward the burner, the thermocouple, and the thermopile.

6. The apparatus of claim 2, wherein the pilot assembly produces a first set of flames via the ports on the first dispenser when in a first operational state and produces a second set of flames via the ports on the second dispenser when in a second operational state.

7. The apparatus of claim 1, wherein heating the thermopile provides electrical power to a control valve.

8. The apparatus of claim 1, wherein heating the thermopile provides electrical power to a thermostat.

9. The apparatus of claim 1, wherein the thermopile desirably permits operation of a heating device without connection to external hardwiring.

10. An apparatus comprising:

a pilot system, said pilot system comprising:

a first fuel dispenser configured to be in fluid communication with a first pilot delivery line; and a second fuel dispenser configured to be in fluid communication with a second pilot delivery line;

an igniter configured to connect to an igniter line; and at least one of a thermocouple configured to connect to a feedback line, and a thermopile configured to connect to a power line;

wherein the pilot system is configured to direct heat from combustion of one of either a first or a second fuel to the at least one of the thermocouple and the thermopile, the first fuel configured to flow through the first fuel dispenser and the second fuel configured to flow through the second fuel dispenser; and a valve assembly comprising:

a housing having a first flow path and a second flow path therethrough;

a valve core positioned within the housing and having a selectable first position and second position within the housing; and an nozzle assembly integral with the housing having a first nozzle outlet and a second nozzle outlet;

wherein the first position of the valve core allows flow through the valve assembly along the first flow path and through the first nozzle outlet, the second position of the valve core allows flow through the valve assembly along the second flow path and through the second nozzle outlet.

11. The apparatus of claim 10, wherein the first dispenser includes a plurality of first ports and the second dispenser includes a plurality of second ports.

12. The apparatus of claim 11, wherein one port of each of the plurality of first and second ports is directed toward a burner, and another port of each of the plurality of first and second ports is directed toward either the thermocouple or the thermopile.

13. The apparatus of claim 12, wherein the pilot system comprises both the thermocouple, and the thermopile and each of the first and second dispensers is configured to direct separate flames toward the burner, the thermocouple, and the thermopile.

14. The apparatus of claim 11, wherein the pilot system produces a first set of flames via the first ports when in a first operational state and produces a second set of flames via the second ports when in a second operational state.

15. The apparatus of claim 10, further comprising a burner.

16. The apparatus of claim 15, further comprising a pressure regulator.

17. The apparatus of claim 16, further comprising an intake valve.

18. The apparatus of claim 10, wherein the pilot system comprises both the thermocouple, and the thermopile.

* * * * *